United States Patent
Judd

(10) Patent No.: US 8,512,023 B2
(45) Date of Patent: Aug. 20, 2013

(54) INJECTION MOLD ASSEMBLY INCLUDING AN INJECTION MOLD CAVITY AT LEAST PARTIALLY DEFINED BY A POLYCRYSTALLINE DIAMOND MATERIAL

(75) Inventor: Robert Keith Judd, Spanish Fork, UT (US)

(73) Assignee: US Synthetic Corporation, Orem, UT (US)

( * ) Notice: Subject to any disclaimer, the term of this patent is extended or adjusted under 35 U.S.C. 154(b) by 75 days.

(21) Appl. No.: 13/005,212

(22) Filed: Jan. 12, 2011

(65) Prior Publication Data

US 2012/0177772 A1    Jul. 12, 2012

(51) Int. Cl.
  *B29C 45/16* (2006.01)
(52) U.S. Cl.
  USPC .......................... 425/121; 425/542; 425/568
(58) Field of Classification Search
  USPC ......................................... 425/121, 542, 568
  See application file for complete search history.

(56) References Cited

U.S. PATENT DOCUMENTS

| | | | |
|---|---|---|---|
| 1,551,751 A | 9/1925 | Kozak | |
| 1,597,927 A | 8/1926 | Simons | |
| 3,110,625 A | 11/1963 | Bettner | |
| 3,823,598 A | 7/1974 | Freeman | |
| 4,046,103 A | 9/1977 | Yakuboff | |
| 4,281,617 A | 8/1981 | Bevers et al. | |
| 4,426,954 A | 1/1984 | Keller | |
| 4,454,657 A | 6/1984 | Yasumi | |
| 4,534,934 A | 8/1985 | Cho | |
| 4,624,817 A | 11/1986 | Gusack et al. | |
| 4,643,741 A | 2/1987 | Yu et al. | |
| 4,783,041 A | 11/1988 | Sakaida et al. | |
| 5,379,853 A | 1/1995 | Lockwood et al. | |
| 5,449,408 A | 9/1995 | Koaizawa et al. | |
| 5,741,446 A | 4/1998 | Tahara et al. | |
| 5,849,083 A | 12/1998 | Milliman | |
| 5,851,137 A | 12/1998 | Bhave et al. | |
| 6,220,375 B1 | 4/2001 | Butcher et al. | |

(Continued)

FOREIGN PATENT DOCUMENTS

| | | |
|---|---|---|
| DE | 3712128 | 10/1988 |
| JP | 11034068 | 2/1999 |
| WO | WO03083148 | 10/2003 |
| WO | WO2005068114 | 7/2005 |

OTHER PUBLICATIONS

Overview of: Polycrystalline Diamond: Manufacture, Wear Mechanisms, and Implications for bit Design. Sneddon, et al. Petroleum Technology vol. 40, No. 12, Dec. 1998, pp. 1593-1601.

U.S. Appl. No. 11/580,817, Aug. 22, 2007, Office Action.

(Continued)

*Primary Examiner* — Tim Heitbrink
(74) *Attorney, Agent, or Firm* — Dorsey & Whitney LLP

(57) ABSTRACT

Embodiments relate to injection mold assemblies that include superhard materials, such as polycrystalline diamond compacts ("PDCs"), and related injection mold presses, components, and methods. The superhard materials are positioned to define at least a portion of a mold cavity for injection molding. Superhard materials may be fully or partially encapsulated by a substrate and the superhard materials and substrate may be secured to the injection mold. Superhard materials may be formed or otherwise separated from a substrate and secured to the injection mold without support of a substrate. Superhard materials may also be attachable to an injection mold to define only a portion of a mold cavity. In an embodiment, an injection mold insert includes a superhard material for insertion into a generic cavity within an injection mold assembly.

13 Claims, 13 Drawing Sheets

(56) References Cited

U.S. PATENT DOCUMENTS

| | | |
|---|---|---|
| 6,314,836 B1 | 11/2001 | Einset et al. |
| 6,402,787 B1 | 6/2002 | Pope et al. |
| 6,410,877 B1 | 6/2002 | Dixon et al. |
| 6,497,727 B1 | 12/2002 | Pope et al. |
| 6,517,583 B1 | 2/2003 | Pope et al. |
| 6,810,712 B2 | 11/2004 | Goto |
| 6,817,550 B2 | 11/2004 | Taylor et al. |
| 6,969,313 B2 | 11/2005 | Sung |
| 7,060,641 B2 | 6/2006 | Qian et al. |
| 7,134,868 B2 | 11/2006 | Babin et al. |
| 7,172,142 B2 | 2/2007 | Taylor et al. |
| 7,461,978 B2 | 12/2008 | Pope et al. |
| 7,540,181 B1 | 6/2009 | Memmott |
| 7,628,234 B2 | 12/2009 | Middlemiss |
| 7,665,898 B2 | 2/2010 | Pope et al. |
| 7,678,325 B2 | 3/2010 | Gardinier |
| 2004/0211222 A1 | 10/2004 | Hosoe |
| 2006/0093700 A1* | 5/2006 | Naito et al. ............ 425/542 |
| 2007/0157670 A1* | 7/2007 | Sung ...................... 425/121 |
| 2008/0145472 A1 | 6/2008 | Oikawa et al. |
| 2008/0154380 A1 | 6/2008 | Dixon et al. |
| 2009/0152018 A1 | 6/2009 | Sani |
| 2009/0272583 A1 | 11/2009 | Pope |
| 2010/0084196 A1 | 4/2010 | Bertagnolli et al. |
| 2011/0045124 A1* | 2/2011 | Zuraw ................... 425/568 |
| 2012/0213884 A1 | 8/2012 | Judd et al. |

OTHER PUBLICATIONS

U.S. Appl. No. 11/580,817, Mar. 24, 2008, Office Action.
U.S. Appl. No. 11/580,817, Jun. 5, 2008, Advisory Action.
U.S. Appl. No. 11/580,817, Oct. 7, 2008, Office Action.
U.S. Appl. No. 11/580,817, Feb. 26, 2009, Notice of Allowance.
U.S. Appl. No. 11/580,817, May 13, 2009, Issue Notification.
International Search Report and Written Opinion from International Application No. PCT/US2012/020266 dated Apr. 10, 2012.
U.S. Appl. No. 13/788,952, filed Mar. 7, 2013, Judd.
U.S. Appl. No. 13/788,952, filed Jun. 26, 2013, Office Action.

* cited by examiner

INJECTION MOLD ASSEMBLY INCLUDING AN INJECTION MOLD CAVITY AT LEAST PARTIALLY DEFINED BY A POLYCRYSTALLINE DIAMOND MATERIAL

BACKGROUND

Since the development of polymers, injection molding processes have gained widespread use due to the ease at which plastics may be melted and cooled to form a desired component. In addition, injection molding is very versatile as it may create parts ranging from only a few millimeters in size to parts that are several meters wide. Injection molding may also produce simple components to components having very intricate details.

While injection molding enjoys widespread use, there is a significant initial cost for an injection molding process due to the molds being expensive to manufacture. Consequently, injection molding is most common for components that are to be mass produced, as the cost of the injection mold may then be amortized over thousands or even hundreds of thousands of components.

Typical molds are constructed from materials, such as aluminum or hardened steel. The choice of what type of material to use in building a mold is largely a question of economics. For instance, the question of whether to build an aluminum or steel mold may depend on considerations related to economics, including the expected life-cycle of the product, the volume of products to be produced, the capital currently available, the size of the mold, the tolerances that need to be maintained, as well as other considerations. While aluminum and steel are readily available for virtually any size of mold, an aluminum mold may be produced at a relatively low cost, and may still be used to mold ten thousand or more parts. If, for example, a company expects to produce only ten thousand parts, the company may select an aluminum mold. In contrast, if a hundred thousand parts are going to be required, the same company may chose to produce the mold from a hardened steel, which exhibits an increases wear resistance relative to aluminum, even if the initial cost of the steel mold is five or more times that of the aluminum mold. Thus, despite the higher initial cost, steel molds may be more economical over the full product run due to an increased lifespan. Indeed, it is not uncommon for a single steel mold to be used to produce hundreds of thousands, or even millions of parts before it wears out.

While steel and aluminum are the most common materials used in manufacturing molds, other materials have also been used. Other materials are typically used, however, where considerations other than cost and mold lifecycle become significant. For instance, due to product details, a mold may be produced to dissipate heat more quickly than aluminum or steel. If temperatures are sufficiently large or prolonged, the injected plastic material may be damaged. Consequently, beryllium-copper alloys are sometimes used in injection molds due to their heat dissipation properties.

Despite the widespread use of steel and aluminum, and to a lesser extent beryllium-copper alloys, in injection molding processes, such materials each exhibit characteristics upon which improvements may be made.

SUMMARY

Various embodiments of the invention are directed to injection mold assemblies, injection mold inserts for use in the injection mold assemblies, and injection mold presses that utilize the injection mold assemblies. In an embodiment, an injection mold assembly includes a first mold plate, a second mold plate, and a molding element secured to one of the first or second mold plates. The first and second mold plates are configured to be abutted along respective mating surfaces thereof to form a mold cavity. The molding element comprises a superhard material that forms at least a portion of the mold cavity.

According to another embodiment, an injection mold insert includes a molding element. The molding element includes at least one surface defining at least a portion of a mold cavity. The at least one surface includes a superhard material. The injection mold insert is sized and configured to be inserted at least partially within a generic cavity of an injection mold plate, and to be secured to the injection mold plate.

According to another embodiment, a method for forming an injection mold includes defining a mold cavity for an injection molding system. The mold cavity is defined by forming multiple surface portions around the mold cavity. The mold cavity is defined by locating a mold segment around at least a portion of the mold cavity, with an interior surface of the mold segment including a superhard material.

According to another embodiment, an injection mold press includes an injection mold assembly and an injection system. The injection mold assembly includes a first mold plate, a second mold plate, and a molding element secured to one of the first or second mold plates. The first and second mold plates are configured to be abutted along respective mating surfaces thereof to form a mold cavity. The molding element comprises a superhard material that forms at least a portion of the mold cavity. The injection system operably may be coupled to the injection mold assembly. The injection system is configured to convey material in an at least partially molten state into the mold cavity of the injection mold assembly.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Various embodiments of the invention are directed to injection mold assemblies and inserts that comprise a superhard material forming at least a portion of a mold cavity and injection mold presses that may utilize such injection mold assemblies and inserts. Superhard materials may be arranged and formed in any number of sizes and configurations. In some embodiments, superhard materials may be available in limited sizes, and mold surfaces around a mold cavity may exceed the available sizes of the superhard materials. Multiple mold segments may be used to enable forming mold cavities of various sizes and configurations, notwithstanding possible limitations in the size of available superhard materials. Thus, a mold cavity may be used for forming components sized larger than size-constrained superhard materials. Superhard materials may also be located along all or a portion of the cavity to provide increased wear resistance to an entire mold or to portions of a mold, such as portions most susceptible to wear.

Figure 1A:
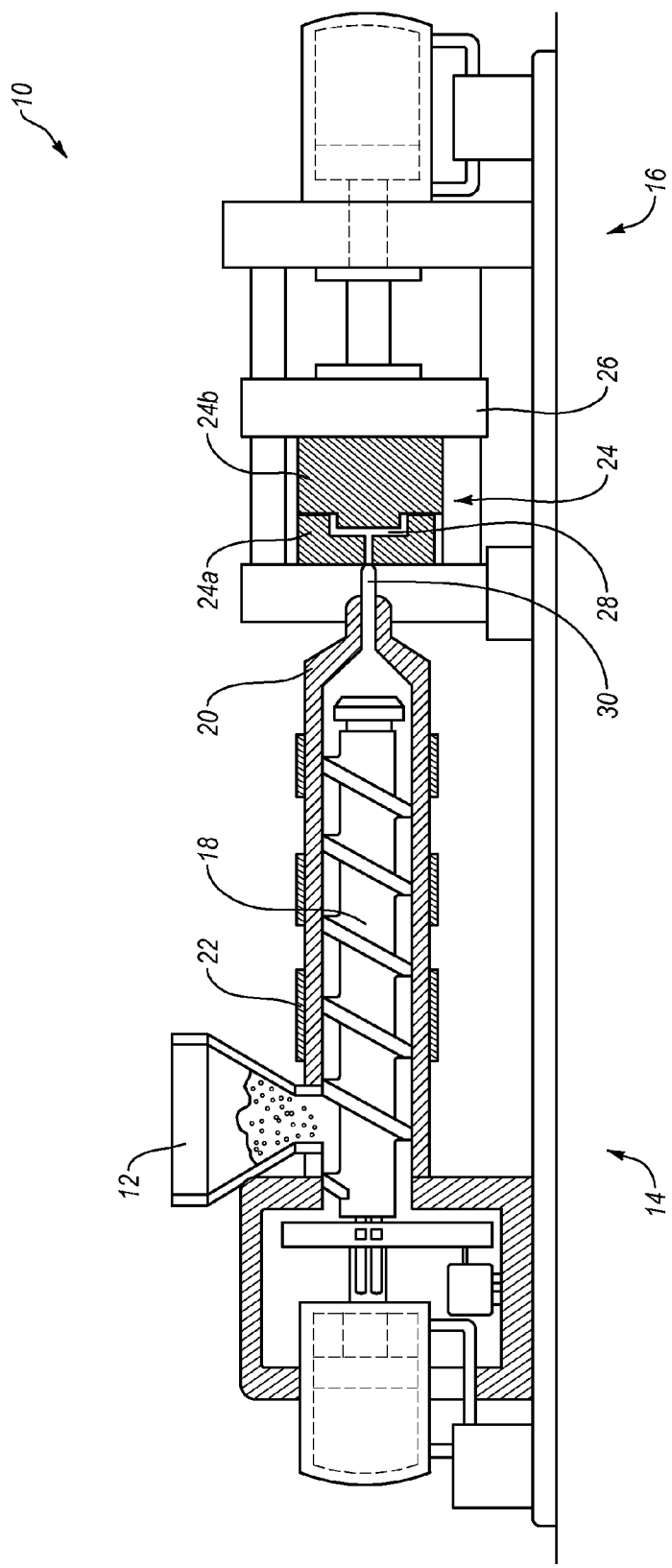
FIG. 1A is a side cross-sectional view of an embodiment of an injection mold press having an injection system and a clamping system that may utilize any of the injection mold assemblies and injection mold inserts disclosed herein.

Various types of injection molding techniques and machinery are available. FIG. 1A is a side cross-sectional view of an embodiment injection molding press 10 that may utilize any of the disclosed injection mold assemblies and inserts. The injection mold press 10 typifies exemplary injection molding equipment and techniques, although the particular configuration or operation of the injection molding press 10 may vary in some regards with respect to other available machines or processes. In the illustrated embodiment, the injection molding press 10 includes a material hopper 12, an injection system 14, and a clamping system 16. More particularly, plastic pellets are generally placed within the material hopper 12, and gravity fed or force fed into the injection system 14. The injection system 14 includes a reciprocating screw 18 that rotates within a barrel 20. A heater 22 surrounds the barrel 20 or otherwise operates to at least partially or completely melt the received pellets.

The melted polymer is conveyed by the reciprocating screw 18 towards the clamping system 16. The clamping system 16 includes a mold 24 that itself includes two plates 24a, 24b. A stationary plate 24a remains in a generally fixed position, while a moving plate 24b is connected to a moveable platen 26. The moveable platen 26 may be selectively moved. As the moveable platen 26 moves, the moving plate 24b also moves in a corresponding direction, which may open or close the mold 24 based on the travel direction. The stationary and moving mold plates 24a, 24b collectively define a mold cavity 28 and, when the mold 24 is in a closed position, the mold cavity 28 is closed within the two plates 24a, 24b.

For example, the injection system 14, which is operably coupled to the material hopper 12 and the mold 24, is configured to receive the plastic pellets from the material hopper 12 and convey the melted polymer into the mold cavity 28.

Figure 1B:
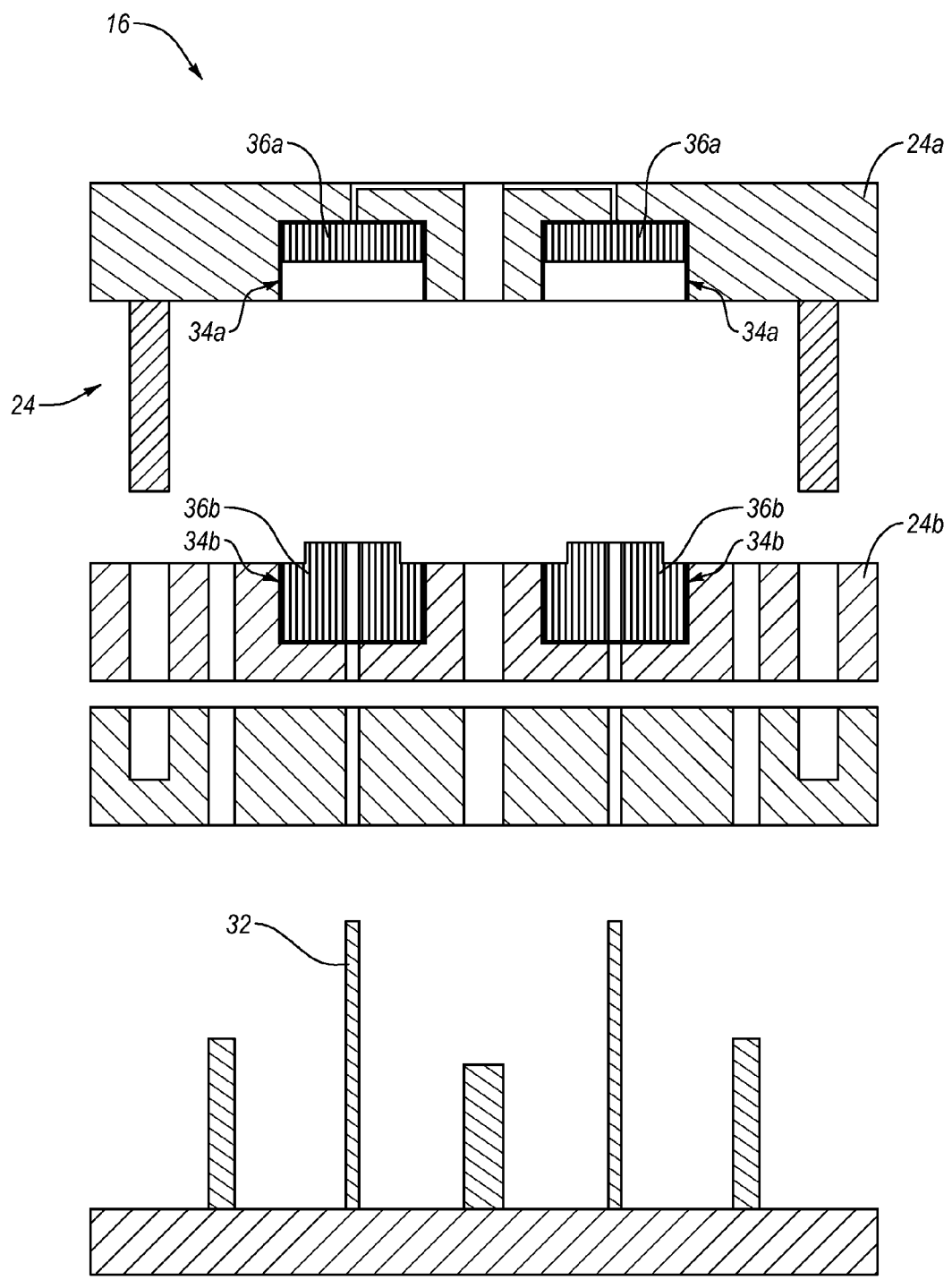
FIG. 1B is an exploded side cross-sectional view of a portion of the clamping system of the injection mold press of FIG. 1A.

With the mold 24 in the closed or clamped position, molten polymer may be forced by the reciprocating screw 18 through a nozzle 30 and into the cavity 28. The injected polymer is then allowed to cool. After cooling, the mold 24 is opened, and ejector pins 32 (see FIG. 1B) are used to extract the molded component from the mold In other cases, the mold 24 may be produced with a generic cavity, and mold elements that are formed separate from the mold 24 may be inserted into the mold and secured in place. For instance, FIG. 1B illustrates an exploded, side cross-sectional view of portions of the clamping system 16 of FIG. 1A. As shown in FIG. 1B, the mold plates 24a, 24b of the mold 24 includes generic cavities 34a, 34b. Mold inserts 36a, 36b are placed within the corresponding generic cavities 34a, 34b. When the mold 24 is closed, the mold cavity 28 (FIG. 1A) is collectively defined by the mold inserts 36a, 36b. The mold inserts 36a, 36b may be formed of the same material as the mold 24, although the mold inserts 36a, 36b may also be formed from one or more other materials that differ from the materials of the mold 24.

Whether the mold cavity 28 (FIG. 1A) is formed directly by the mold plates 24a, 24b, or by using inserts 36a, 36b, each of the walls and surfaces defining the cavity 28 may be formed of the same type of material. By using the same type of material throughout, the wear resistance properties remain relatively constant through the entire mold. Unfortunately, different sections of the cavity 28 may nonetheless wear at different rates than each other. For instance, molten polymer may flow at different rates and/or may be different temperatures at different sections of the mold. Although the properties of the mold materials may be the same at each section of the mold, the differences in polymer flow rate and/or temperature may affect the wear differently at the various sections. For instance, sections at which the flow rate is greater and/or the temperatures are greater may tend to wear more rapidly than other sections. Other factors in addition to flow rate and/or temperature (e.g., cavity size, flow type, pressures, material, combinations thereof, etc.) may also cause a mold to wear non-uniformly, and in a manner that decreases the life cycle and cost effectiveness of the mold. For instance, an injected material may include: glass filled thermoplastics (e.g., nylon, acetal, polycarbonate, polyester, etc.); a graphite filled thermosets (e.g., nylon, acetal, polycarbonate, polyester, etc.); epoxy resin type thermosets; thermoplastics; polyethylene, polypropylene; polymethylmethacrylate; polymacon; hydrogels (e.g., silicone hydrogels); polycarbonate; nylon; alloys (e.g., polycarbonate and acrylonitrile butadiene styrene ("ABS") alloy, acrylic and polyvinyl chloride ("PVC") alloy, etc.); other suitable materials, or any combination of the foregoing.

Figure 2:
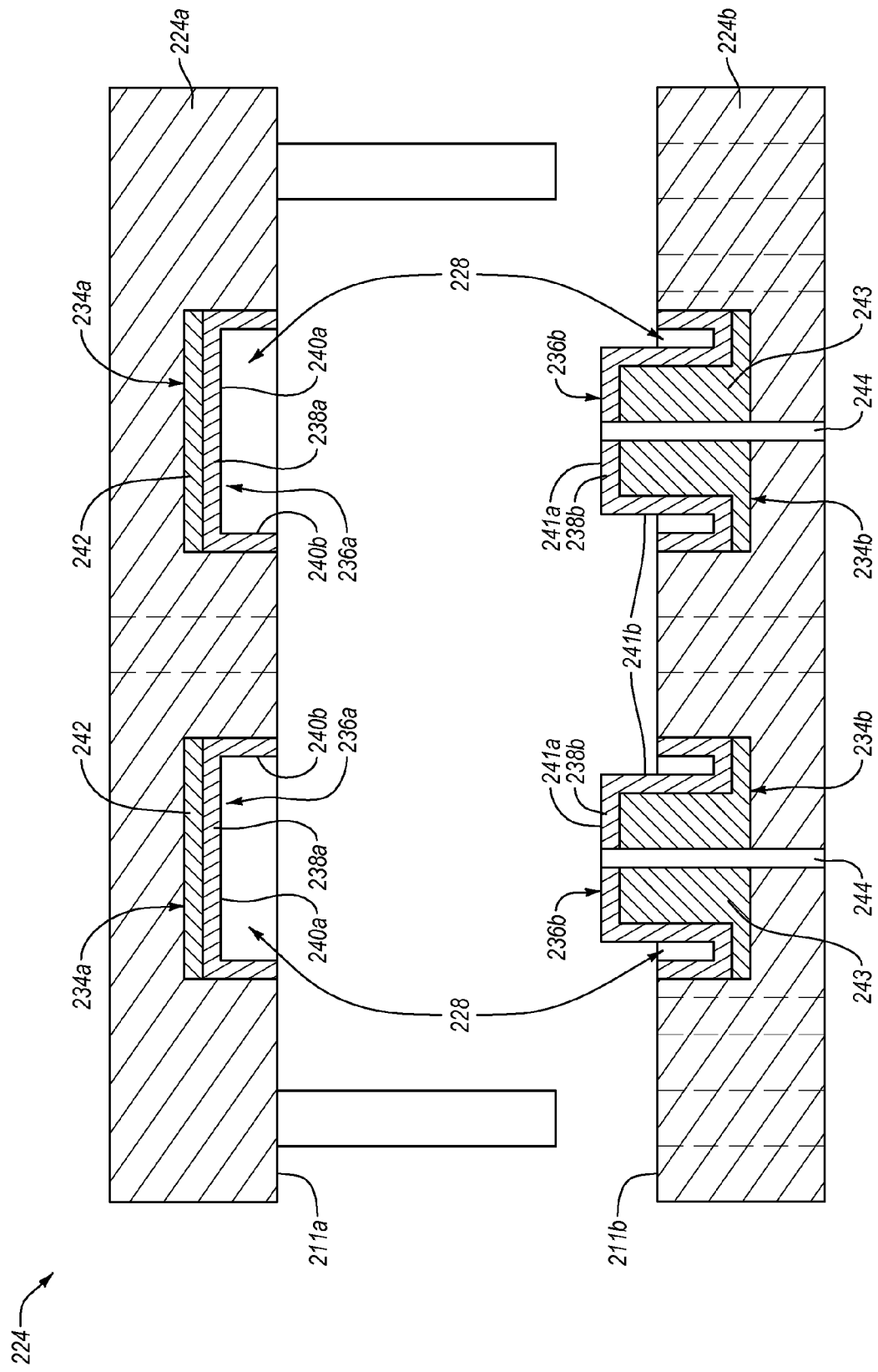
FIG. 2 is a side cross-sectional view of an injection mold assembly having a two mold plates, and including a superhard material partially encapsulated by a substrate in accordance with one embodiment.

FIGS. 2-14 illustrate various embodiments for injection mold assemblies and inserts that comprise a superhard material forming at least a portion of a mold cavity. FIG. 2 shows an injection mold assembly 224 in accordance with various embodiments of the invention, and which may be used to improve wear resistance properties of the injection mold assembly 224. The injection mold assembly 224 includes two mold plates 224a, 224b, and the mold plates 224a, 224b are moveable relative to each other and define a mold cavity 228. More particularly, inner surfaces of the mold plates 224a and 224b and/or the mold inserts 236a and 236b inserted into, or formed within, the mold plates 224a, 224b, cooperate to collectively define the mold cavity 228 when the mold plates 224a and 224b are abutted generally along mating surfaces 211a and 211b. When molten polymer or another material is injected into the mold cavity 228, the polymer cools and forms a component having a shape generally defined by the mold cavity 228.

Those skilled in the art may refer to the plates defining the mold cavity 228 according to a variety of different nomenclatures. For simplicity, the phrase "mold plates" is used herein to generally describe the components that when assembled, form a mold cavity for injection molding. Such phrase is intended to include plates or sides that are referred to in the art as: stationary and moving sides; A and B plates; and injection and ejector molds.

Although the injection mold assembly 224 of FIG. 2 includes two mold plates 224a, 224b, in various other embodiments, an injection mold assembly may have at least three plates or other components that collectively define one or more mold cavities 228. In the illustrated embodiment, the two mold plates 224a, 224b of the injection mold assembly 224 collectively define two mold cavities 228 when the mold plates 224a and 224b are abutted generally along the mating surfaces 211a and 211b, and each of the mold cavities 228 may be used to form a separate component. In this embodiment, the two mold cavities 228 are substantially identical, although it should be appreciated that the mold cavities 228 may vary relative to each other. In other embodiments, more or fewer than two mold cavities 228 may be included in a single injection mold assembly.

The mold plates 224a, 224b collectively define the cavities 228 when the mold plates 224a and 224b are abutted generally along the mating surfaces 211a and 211b. The injection mold assembly 224 as shown in FIG. 2 illustrates an open configuration in which two halves of the cavity 228 are separated. Each half of the cavity 228 may thus also be considered a mold cavity. In operation, the mold plates 224a, 224b may be drawn together such that the mating surfaces 211a and 211b abut one another to place the injection mold assembly 224 in a closed assembly, thereby also closing the cavity 228. When the cavity 228 is closed, molten plastic or another material may be injected to begin formation of the molded component.

In the embodiment illustrated in FIG. 2, multiple surfaces within the injection mold 224 define the cavity 228. More particularly, surfaces of the injection mold 224 that define the boundaries of the cavity 228 are, in this example, formed from first and second molding elements 238a and 238b which surround the cavity 228 collectively defined by the assembly that includes mold plates 224a, 224b when the mold plates 224a, 224b are abutted generally along the mating surfaces 211a and 211b. The molding elements 238a, 238b may be made from a superhard material. As used herein, the term "superhard," or the phrase "superhard material," refers to any material having a hardness that is at least equal to the hardness of tungsten carbide.

The molding elements 238a, 238b are optionally bonded to substrates 242 and 243. In some embodiments, the substrates 242 and 243 may be a cobalt-cemented tungsten carbide substrate. In some embodiments, the molding elements 238a and 238b may be natural diamond, polycrystalline diamond, polycrystalline cubic boron nitride, silicon carbide, diamond grains bonded together with silicon carbide, or any combination of the preceding materials. In some embodiments, the superhard material may be thermally-stable diamond in which a catalyst material (e.g., iron, nickel, cobalt, or alloys thereof) has been at least partially depleted from a surface or volume of the polycrystalline diamond using, for example, a leaching process. A cemented carbide substrate (e.g., cobalt cemented, nickel cemented, cemented using alloys of cobalt, or cemented using alloys of nickel) may comprise any suitable carbide, such as tungsten carbide, tantalum carbide, vanadium carbide, niobium carbide, chromium carbide, titanium carbide, or combinations of the foregoing carbides.

In one embodiment, a majority of the mold cavity 228 is bounded by surfaces made from one or more polycrystalline diamond compacts ("PDCs"). For instance, the substrate 242 and/or the substrate 243 may be a cobalt-cemented tungsten carbide and the molding elements 238a and 238b may be polycrystalline diamond. Such structures may be fabricated by subjecting diamond particles, placed on or proximate to a cobalt-cemented tungsten carbide substrate, to a high-pressure/high-temperature ("HPHT") sintering process. The diamond particles with the cobalt-cemented tungsten carbide substrate may be HPHT sintered at a temperature of at least about 1000° Celsius (e.g., about 1100° C. to about 1600° C.) and a pressure of at least about 40 kilobar (e.g., about 50 kilobar to about 90 kilobar) for a time sufficient to consolidate and form a coherent mass of bonded diamond grains. In such a process, the cobalt from the cobalt-cemented tungsten carbide substrate sweeps into interstitial regions between the diamond particles to catalyze growth of diamond between the diamond particles. More particularly, following HPHT processing the molding elements 238a, 238b may comprise a matrix of diamond grains that are bonded with each other via diamond-to-diamond bonding (e.g., $sp^3$ bonding), and the interstitial regions between the diamond grains may be at least partially occupied by cobalt that has been swept in, thereby creating a network of diamond grains with interposed cobalt (otherwise known as polycrystalline diamond ("PCD")).

In other embodiments, the substrate 242 and/or the substrate 243 may be omitted, with the molding elements 238a, 238b including superhard materials, including, but not limited to, cemented tungsten carbide or polycrystalline diamond. In another embodiment, a superhard material (e.g., diamond) may be deposited, using chemical vapor deposition, physical vapor deposition, or plasma-assisted chemical vapor deposition. Such deposition techniques, may utilize a substrate that may be formed to the shape of all or a portion of the mold cavity 228, or machined, ground, electro-discharge machined, or otherwise shaped to the desired shape of the mold cavity 228 after deposition or other formation of the superhard material. Example methods for depositing a superhard material are described in U.S. Pat. No. 7,134,868, the disclosure of which is incorporated herein, in its entirety, by this reference The molding elements 238a, 238b may define at least a portion of the mold cavity 228. In particular, a selected topography or other features may be formed within the molding elements 238a, 238b. In FIG. 2, the molding elements 238a in the mold plates 224a define a recess, while the molding element 238b in the mold plate 224b defines a protrusion. The recess defined in the mold plate 224a is open at an end configured to mate with the protrusion defined by the corresponding molding element 238b in the opposing mold pate 224b when the mold plates 224a, 224b abut along the mating surfaces 211a, 211b.

By way of illustration, the molding element 238a in FIG. 2 includes a generally planar base surface 240a, while side surface 240b extends from the base surface 240a and is non-parallel to the base surface 240a (e.g., extending generally perpendicularly from the base surface 240a). The molding element 238b in FIG. 2 includes a generally planar upper surface 241a, while a side surface 241b extends from the upper surface 241a and is non-parallel to the upper surface 241a (e.g., extending generally perpendicularly from the upper surface 241a). As the mold plates 224a, 224b are drawn together and abut along the mating surfaces 211a, 211b, the protrusion defined by the upper surface 241a and side surface 241b may enter into the recess defined by the base surface 240a and side surface 241b. A separation may exist between all or portions of the base/upper surfaces 240a, 241a and/or the side surfaces 240a, 241b. Thus, the base surface 240a and upper surface 241a, and the side surfaces 240b, 241b may collectively define at least a portion of the mold cavity 228.

In a conventional process for forming PDCs, a superhard material is bonded to the substrate 242 and/or the substrate 243. Through such a process, cavities, recesses, protrusions, or other topography may be directly formed into the surface of the PDC, although such topographical elements may also be formed in other manners. By way of illustration, where PDCs are used to form all or a portion of the molding elements 238a, 238b, a recess, protrusion, and/or any other feature may be produced by machining the molding element 238a, 238b. For instance, electrical-discharge machining ("EDM"), laser cutting, waterjet, other machining processes, polishing processes, or a combination of the foregoing, may be used to shape the molding elements 238a, 238b and form at least one surface defining at least a portion of the mold cavity 228. Similar techniques may also be used to form an opening in the molding element 238b and/or substrate 243 to coincide with an ejector pin opening 244 in the mold plate 224b. Such an opening in the molding element 238b and/or substrate 243 may allow an ejector pin to pass therethrough and facilitate removal of formed parts or components.

It should be appreciated in view of the disclosure herein that injection molding processes may use an injection mold assembly to form any number of differently shaped parts or components, and with varying degrees of intricacy. Accordingly, while FIG. 2 illustrates an injection mold assembly 224 in which each of two mold plates 224a, 224b include complementary molding elements 238a, 238b, this example is illustrative only. For instance, in some embodiments, molding element 238b may not extend outside the footprint of the mold plate 224b and can correspond to a protrusion and/or recess formed in a corresponding molding element 238a. Thus, differently shaped molding elements 238a, 238b may be used on each mold plate 224a, 224b. Moreover, machining or otherwise forming the surfaces that define the mold cavity 228 does not necessarily result in horizontal, vertical, or planar surfaces. Rather, surfaces of any number of topography, orientation, surface treatment, surface finish, curvature, or the like may be machined or otherwise formed upon a superhard portion of a mold cavity using the techniques contemplated herein. Further still, machining or otherwise forming the molding element 238a, 238b in a desired shape does not necessarily create a cavity 228 solely or primarily defined by one or more surface of the molding elements 238a, 238b. For instance, in some embodiments, a mold cavity may be defined by molding elements that are in effect open-ended, such that one or more surfaces of the mold cavity are defined by the mold plates 224a, 224b (e.g., surfaces bordering or defining the generic cavities 234).

According to at least some embodiments, the mold cavity 228 is at least partially defined by surfaces of the molding elements 238a, 238b from the two mold plates 224a, 224b. As described with respect to FIG. 2, the molding elements 238a, 238b in mold plates 224a, 224b may be formed of superhard materials sintered in a high-pressure, high temperature ("HPHT") process. Such a molding element may be machined, as described above. Alternatively, a molding element may be formed by incorporating one or more superhard materials. For instance, a plug, can, or other insert made of tungsten, niobium, steel, or another material, or any combination thereof, may be placed within a mold. The mold may be provided inside a press or other structure such that as the molding elements 238a, 238b are formed, they form around the insert. When the insert is removed, a void may be formed where the insert was located. Thus, even in the absence of machining, superhard materials may be formed to include a desired surface or other feature that may be used to define one or more surfaces of a mold cavity. In still other embodiments, some examples of which are disclosed herein, multiple segments may be produced and connected together to form the surfaces of the mold cavity 228.

In some embodiments, the molding elements 238a, 238b are formed separate from the mold plates 224a, 224b, and are later added to define the mold cavity 228. For instance, in the embodiment in FIG. 2, the mold plates 224a, 224b include generic cavities 234a, 234b therein. The generic cavities 234a, 234b may be formed in the mold plates 234a, 234b using any suitable process. For instance, machining, EDM, CNC machining, waterjet, laser cutting, other techniques, or combinations thereof may be used to produce a generic cavity 234a, 234b into which mold inserts 236a, 236b may be inserted. As used herein, the phrase "generic cavity" refers to any mold cavity in a mold plate that is adapted to receive a separately formed mold insert, with the mold insert, rather than the mold plate, defining the mold cavity 228 in the shape of a desired part or component.

More particularly, the mold inserts 236a, 236b may be formed from the molding elements 238a, 238b and the substrates 242, 243. After production of the generic cavities 234a, 234b in the mold plates 224a, 224b, the mold inserts 236a, 236b may be introduced into the generic cavities 234a, 234b and secured in place. Optionally, the mold inserts 236a, 236b may be secured in place using a retention member (not shown), by brazing, press-fitting, integrally formed in, or otherwise secured to the mold plates 224a, 224b. The retention member may mate with a corresponding structure in the mold insert 236a, 236b. In one embodiment, the mold inserts 236a, 236b may be secured to the mold plates 224a, 224b by securing exterior surfaces of the substrates 242, 243 and/or molding elements 238a, 238b to the mold plates 224a, 224b. For instance, the exterior sides of the substrates 242, 243 and/or side surfaces 240b, 241b of the molding elements 238a, 238b may be attached to the generic cavity walls in the mold plates 224a, 224b by brazing, soldering, an adhesive, press fits, mechanical fasteners, or other techniques, or combinations thereof. Where brazing is used, a brazing alloy may be used in the form of a rod, ribbon, powder, paste, cream, or other form. Exemplary brazing alloys suitable for connecting the substrates 242, 243 and/or molding element 238a, 238b to the mold plates 224a, 224b include combinations of two or more elements selected from a group that includes aluminum-silicon, boron, copper, gold, nickel, phosphorus, silver, tin, zinc, or other materials.

In some embodiments, the mold inserts 236a, 236b may include additional or other materials or elements. For instance, the substrates 242, 243 may be brazed or otherwise connected to a steel plate or other structure that also forms the insert. In one embodiment, the substrates 242, 243 may be removed and the molding elements 238a, 238b may be brazed or otherwise secured to a steel component, or some other component made from another material. The additional plate or component may form part of a mold insert and may be placed within a generic cavity 234a, 234b, and optionally secured to a corresponding mold plate 224a, 224b.

As shown in FIG. 2, only some surfaces of the molding elements 238a, 238b may be bonded directly to the substrates 242, 243, respectively, in some embodiments. For instance, in FIG. 2, the side surfaces 240b of molding element 238a are optionally not surrounded by the substrate 242, thereby allowing the side surfaces 240b to directly engage the mold plate 224a. Additionally or alternatively, all or a portion of the side surfaces 240b may be bonded to another material within the insert 236a (e.g., steel, aluminum). In some embodiments, the side surfaces 240a are sized to extend out of the generic cavity 234a, such that if the side surfaces 240b are bonded directly to the mold plate 224a, such bonding may be along less than the full length of the side surfaces 240b. In still other embodiments, the molding element 238a may be fully encompassed and/or supported by the substrate 242, as explained below.

Figure 3:
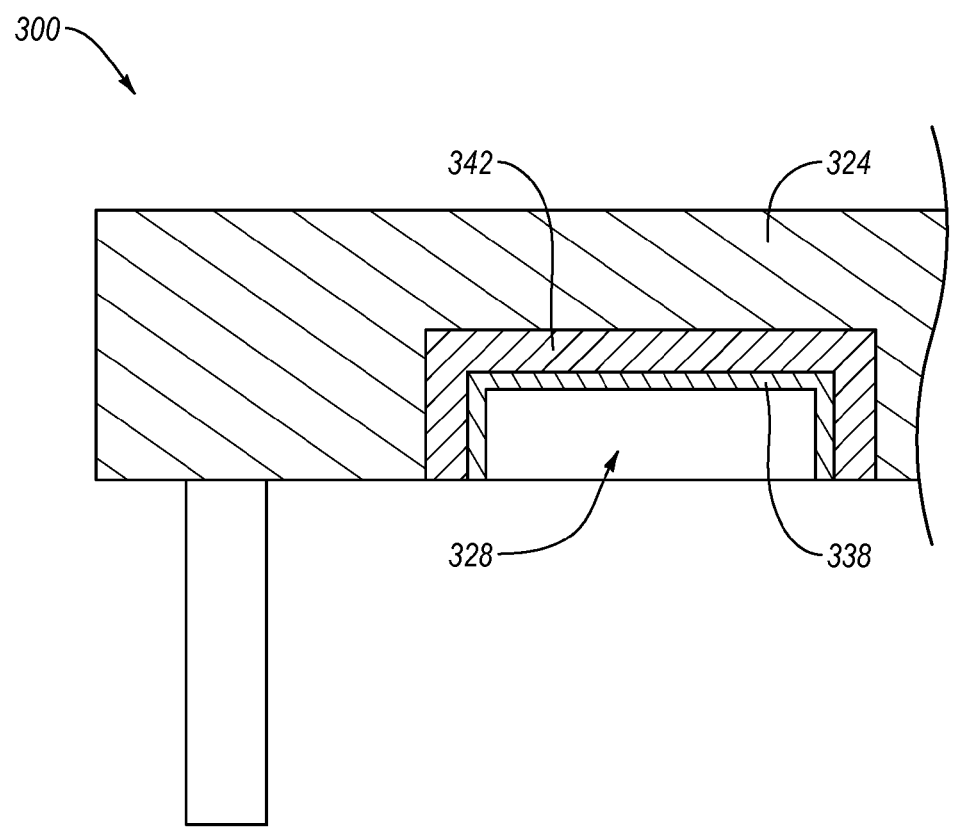
FIG. 3 is a partial side cross-sectional view of an injection mold assembly having a superhard materially fully encapsulated by a substrate in accordance with another embodiment.

FIG. 3 illustrates, for example, a side cross-sectional view of a portion of a mold assembly 300 that includes a mold plate 324 that includes a molding element 338 defining a mold cavity 328. The illustrated molding element 338 is similar to the molding element 238a in FIG. 2, except that in FIG. 3 each of the surfaces of the molding element 338 that are used to define the mold cavity 328 is also adjacent to a respective portion of substrate 342. Thus, the molding element 338 may be considered to be fully encapsulated or supported by the substrate 342, while the molding element 238 of FIG. 2 is only partially encapsulated or supported by the substrate 242.

Referring again to FIG. 2, it will be appreciated that embodiments of a mold 224 may be placed in a closed configuration such that the mold cavity 228 will be fully bounded, or substantially fully bounded, by the mold inserts 236a, 236b, and more particularly by the molding elements 238. It should, however, be appreciated that such a configuration is merely exemplary. In other embodiments, for instance, only portions of the mold cavity 228 may be defined by surfaces of the mold inserts 236a, 236b and/or the molding elements 238a, 238b. By way of example, the mold inserts 236a, 236b may be sized and otherwise configured to utilize a portion of the surfaces defining the generic cavities 234a, 234b to also define the size, shape, or other configuration of the mold cavities 228. In still other embodiments, the mold inserts 236a, 236b may include multiple materials that collectively make up one or more surfaces defining the mold cavities 228. For instance, instead of the molding element 238 fully enclosing the mold cavity 228, the mold cavity 228 may be bounded by surfaces that include the molding element 238, the substrate 242, the mold plates 224a, 224b, or additional materials included in the mold inserts 236a, 236b. The mold cavity may thus be defined by surfaces produced from a single material or from any combination of materials that may include a superhard material, a substrate material, steel, aluminum, beryllium-copper alloy, another material, or any combination of the foregoing.

The use of superhard materials such as those contemplated in the present disclosure may provide wear resistance properties that extend the lifecycle of the injection mold assemblies and/or mold inserts described herein. For instance, in some applications, hardened steel may wear at a rate that is between about two and five times greater than superhard materials. Such relative wear rates are, however, merely exemplary and may vary based on any number of different factors, and in other applications the wear rate of hardened steel may be less than two or greater than five times the wear rate of superhard materials. Thus, in at least some applications, use of superhard materials in an injection mold may significantly increase the potential lifecycle of an injection mold assembly. The number of molded components producible from a single injection mold may accordingly be increased by using superhard materials rather than steel, aluminum, or other materials.

While superhard materials may thus provide desirable wear characteristics, use of some superhard materials may be limited. For instance, certain types of superhard materials may be manufactured in limited quantities, or may be available only in certain sizes. Such limitations may be the result of technological, quality or economic constraints. For instance, in some cases, the technology to produce large segments of a superhard material may not exist, or developing machinery that may produce large segments may be cost prohibitive, or result in low quality. PDCs are one such material that are considered to have production size constraints. For instance, as described herein, PDCs may be produced using an HPHT sintering process. To maintain the temperature and pressure requirements over a large surface area, and thereby produce large segments of PDCs, could consume large amounts of power and require large, powerful, and sophisticated machinery. If such pressure and temperature tolerances are not maintained, the PDCs may introduce porosity or other defects that reduce the desirable wear resistance characteristics of the PDCs. Moreover, the temperature and/or pressure requirements for production of a high quality PDC may exceed the capabilities of currently available HPHT presses. Consequently, PDCs are currently produced under size restrictions. For example, PDCs are available in limited sizes that typically range up to about 25 mm to about 30 mm in diameter for cylindrical PDCs, and up to about 2.0 mm in diamond table thickness.

Where the injection mold assembly 224 of FIG. 2, and/or the injection mold assembly 300 of FIG. 3, include molding elements formed from PDCs or other polycrystalline diamond material, use of a unitary PDC for an entire molding element may currently be available primarily where the mold cavity is very small. Injection molding is, however, often used to produce components larger than typical PDCs. Because of the significant wear resistive properties that PDCs or other superhard materials provide, it is nonetheless desirable to use such materials for larger molds, even when the molds exceed the size of available superhard materials.

Figure 4:
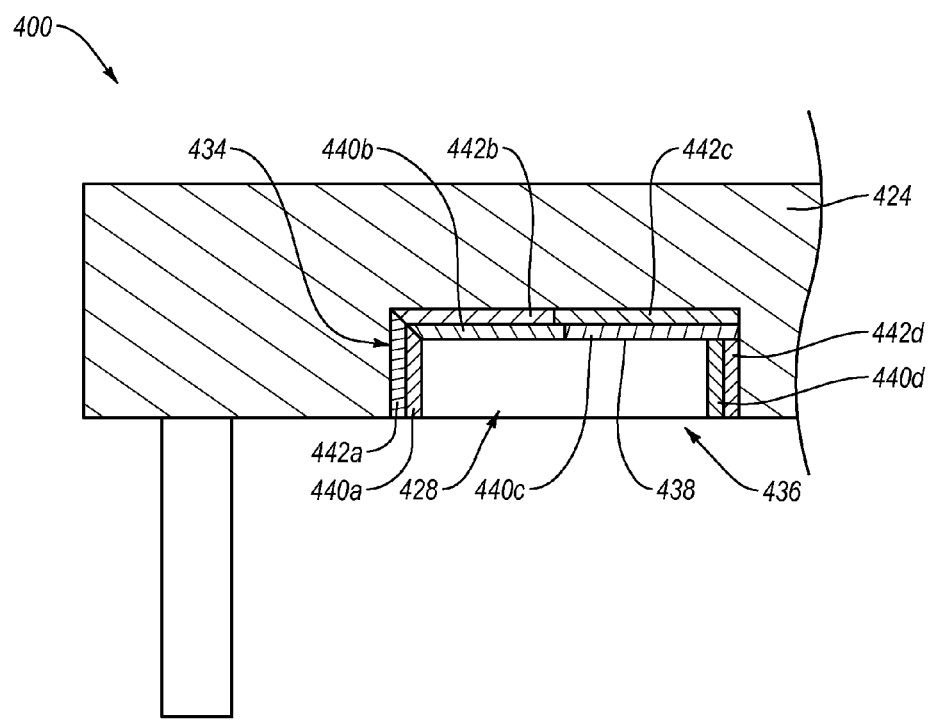
FIG. 4 is a partial side cross-sectional view of an injection mold assembly having various non-unitary mold segments attached together to define a mold cavity according to another embodiment.

According to some embodiments, superhard materials such polycrystalline diamond and PDCs including polycrystalline diamond may be used to define only a portion of a mold cavity, or multiple segments of the materials may be joined together to define the mold cavity. FIG. 4 illustrates an embodiment in which multiple segments are combined to define the mold cavity.

In particular, FIG. 4 illustrates a portion of a mold assembly 400 that includes a mold plate 424. The mold plate 424 may be formed of a material such as steel or aluminum and may be used as a moving or stationary plate within the mold assembly 400. The mold plate 424 further defines a generic cavity 434, while a molding element 438 defines at least a surface of a mold cavity 428. The shape, size, and configuration of the generic cavity 434 and/or mold cavity 428 may be varied in any number of suitable manners. For instance, the generic cavity 434 may be sized to be small enough that a unitary PDC may be inserted as the molding element 438, although in other embodiments, the generic cavity 434 is larger than may feasibly be defined by a unitary PDC.

In the illustrated embodiment, the mold cavity 428 is defined by a set of molding element segments 440a, 440b, 440c, and 440d that have internal surfaces defining the boundaries of the mold cavity 428. External surfaces of the molding element segments 440a-d are bonded to substrate segments 442a, 442b, 442c, and 442d. The mold cavity 428 is illustrated as being in an open configuration. In practice, the mold cavity 428 remains open until a cooperating mold plate (not shown) is placed immediately adjacent the mold plate 424, thereby closing the mold cavity 428.

In the particular embodiment illustrated in FIG. 4, the molding element 438 includes four molding element segments 440a-d that are secured in place relative to each other and collectively define the mold cavity 428. Each molding element segment 440a-d is further attached to a corresponding one or more of substrate segments 442a-d. The molding element segments 440a-d are optionally formed on the substrate segments 442a-d as described herein, or as may be apparent to one of skill in the art in view of the disclosure herein. In other embodiments, the molding element segments 440a-d may be formed without, or removed from, the substrate segments 442a-d.

The molding element segments 440a-d and/or substrate segments 442a-d may be configured to connect to adjacent segments. The mold assembly 400 in FIG. 4, for example, shows three different mechanisms for attaching the molding element segments 440a-d and/or substrate segments 442a-d together, although any suitable attachment mechanism or procedure may be used. According to one embodiment, a connection mechanism may be used to connect molding element segments that are angularly offset relative to each other. For instance, the first molding element segment 440a is illustrated as being generally perpendicular relative to the second molding element segment 440b, although such angle is merely exemplary. To facilitate a connection between such segments, mating edges of the first and second element segments 440a, 440b are beveled at a forty-five degree angle. When the beveled edges are mated together, a miter joint is formed. The first and second substrate segments 442a, 442b may be similarly beveled to cooperate in joining the first and second molding element segments 440a, 440b. Cooperating beveled edges may be machined or directly formed into the first and second molding element segments 440a, 440b and/or first and second substrate segments 442a-b. After the first and second molding element segments 440a, 440b are formed or machined, they may be assembled by connecting them at the miter joint. To secure the first and second molding element segments 440a, 440b relative to each other, the first and second molding element segments 440a, 440b and/or first and second substrate segments 442a, 442b may be secured using brazing, soldering, adhesives, mechanical fasteners (e.g., screws or rivets), or any other suitable device or technique, or any combination of the foregoing.

A miter joint is merely one manner of attaching separate molding element segments such that they are angularly offset relative to each other. Other techniques, including dovetails, press fits, mechanical fasteners, and the like may additionally or alternatively be used in the absence of a miter joint. For instance, FIG. 4 also illustrates third and fourth molding element segments 440c, 440d that are generally perpendicular relative to each other. In this embodiment, the third and fourth molding element segments 440c, 440d do not include a miter joint, but mate at a blunt edge of the fourth molding element segment 440d. In particular, distal edges of the fourth molding element segment 440d and the fourth substrate segment 442d are generally parallel to a surface of the third molding element segment 440c, and may be placed directly thereon. When positioned in this manner, the fourth molding element segment 440d and the fourth substrate segment 442d may then be secured to the interior surface of the third molding element segment 440c.

It should also be appreciated in view of the disclosure herein that molding element segments may be joined together at any angular orientation relative to an adjoining segment. Thus, while the first and fourth molding element segments 440a, 440d are generally perpendicular to the second and third molding element segments 440b, 440d, this is merely exemplary. The angular offset may be more or less than ninety degrees, and in some embodiments, complex curves or other shapes may be formed.

Molding element segments may also be joined so as to generally conform to an adjacent segment. For instance, in FIG. 4, the molding surfaces of the second and third molding element segments 440b, 440c are generally aligned to one another. To facilitate the joining, abutting, or mating of the second and third molding element segments 440b, 440c, a stepped or jogged seam may be used. In particular, in this embodiment, the non-beveled edges of the second molding element segment 440b and second substrate segment 442b are horizontally offset relative to each other. Similarly, the corresponding edges of the third molding element segments 440c and third substrate segment 442c have the same offset, but in a complementary configuration. More specifically, the molding element segments and the substrate element segments are offset such that the second and third molding element segments 440b, 440c are adjacent at a vertical seam, while an underside surface of the second molding element segment 440b also engages a portion of the third substrate segment 442c along a horizontal seam.

The injection mold assembly 400 of FIG. 4 is merely an example of one manner of connecting multiple mold segments to define a mold cavity 428. Additionally, while the illustrated embodiment depicts four molding element segments 440a-440d configured in three different manners, this is merely for convenience to illustrate that any number of connection mechanism may be used, and one or more techniques may be used to define the same mold cavity 428. More specifically, two, three or more than four molding element segments may collectively form a mold cavity, and each molding element segment may connect to adjacent segments using a same connection technique, or with two or more different techniques. For instance, adjacent molding element segments may be joined by using a dovetail, press fit, blunt cut, beveled cut, mechanical fastener, or other technique, or any other combination thereof. Molding element segments may be angularly offset in a similar manner, by using dovetail, press fit, blunt cut, beveled cut, mechanical fastener, or other techniques, or combinations thereof.

To facilitate forming of the mold cavity 428, the molding element segments 440a-d and the substrate segments 442a-d may be connected, joined, or otherwise arranged outside of the generic cavity 434 in the mold plate 424. The molding element segments 440a-d and the substrate segments 442a-d may thus form a mold insert 436 that may be positioned within a generic cavity in the mold plate 424. Optionally, the molding element segments 440a-d and/or the substrate segments 442a-d are connected to one or more other materials (e.g., steel, aluminum) that also form part of the insert 436. In other embodiments, the molding element segments 440a-d and the substrate segments 442a-d may be assembled together within the generic cavity in the mold plate 424.

Employing multiple molding element segments 440a-440d enables the mold cavity 428 to be formed with virtually any desired dimension and/or configuration. For example, in one embodiment, a mold cavity 428 may exhibit a cross-sectional size of greater than about 30 mm. When the molding element 438 comprises superhard materials such as a PDCs that are difficult to produce at such a size, smaller molding element segments 440a-d may be fabricated using the HPHT sintering process in a cubic or belt press, without limitation. Accordingly, an HPHT press capable forming the entire molding element 438 is not necessary because the molding element segments 440a-d may be cut or otherwise formed from a small conventionally formed PDCs, or formed to near net shape in a conventional HPHT press. Additionally, forming smaller individual molding element segments 440a-d may produce fewer defects, such as porosity or other structural defects that may be more common when forming larger sized PDCs. Fewer defects may result in a longer operational lifetime and higher production yields for the injection mold assembly 400.

The cross-sectional view of the mold assembly 400 in FIG. 4 depicts the mold cavity 428 as having a generally rectangular cross-sectional shape. Such shape may result from a mold cavity having a rectangular shape, or even a mold cavity that is generally cylindrical. Where a mold cavity is generally cylindrical, or is otherwise curved, separate molding element segments and substrate segments may be attached to extend circumferentially around a mold cavity.

Figure 5:
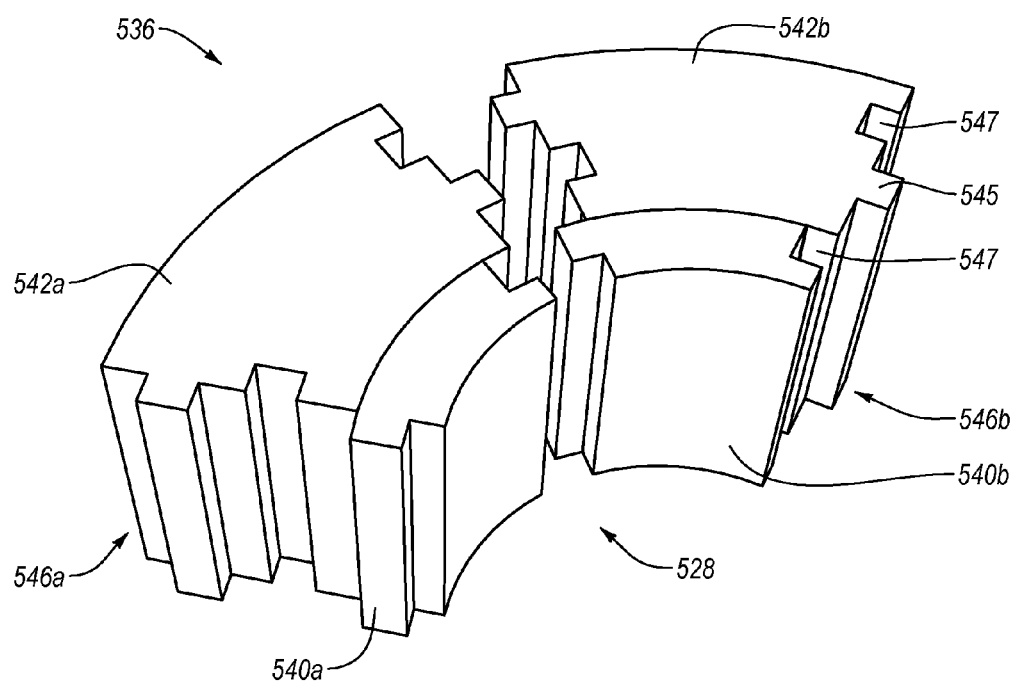
FIG. 5 is an exploded isometric view of two segments of a superhard material bonded to a substrate and connectable to extend circumferentially around mold cavity according to another embodiment.

Further, in the embodiment shown in FIG. 4, the surfaces of the mold insert 436 are generally planar. However, in other embodiments, the surfaces may exhibit a variety of different non-planar configurations. FIG. 5 shows an embodiment for a non-planar geometry. As shown in FIG. 5, the mold segments 546a, 546b exhibit a non-planar, arcuate geometry configured to extend circumferentially around the mold cavity 528. In addition to the arcuate geometry for the mold segments 546a, 546b, in other embodiments, any of the surfaces defining the mold cavity 528 may be the stepped or jogged, concave, convex, helical, or have any other configuration, or a combination of the foregoing.

With continued reference to FIG. 5, each of the mold segments 546a, 546b is sized to extend around approximately forty-five degrees of the mold cavity 528, although such is merely exemplary, and the mold segments 546a, 546b may extend circumferentially to provide mold surfaces that correspond to smaller or larger portions of a mold cavity. Additionally, the molds segments 546a, 546b may be the same or different.

Each mold segment 546a, 546b in FIG. 5 includes a molding element segment 540a, 540b bonded to a corresponding substrate segment 542a, 542b. In accordance with one embodiment, the side edges of the molding element segments 540a, 540b may be adapted to mate with adjacent molding element segments 540a, 540b, such that one or both of the molding element segments 540a, 540b extends circumferentially around at least a portion of the mold cavity 528. Any suitable mechanism for mating adjacent molding element segments 540a, 540b may be utilized. In the some embodiments, mating tongues 545 and grooves 547 may be cut, molded, machined, or otherwise formed in the mold segments 546a, 546b and/or the substrate segments 542a, 542b. Other structures providing a similar function (e.g., dovetail, miter, mortise-and-tenon, and lap joints) may additionally or alternatively be used. In still other embodiments, no specific structure may be formed in the mold segments 546a, 546b. For instance, substantially planar surfaces may be brazed, soldered, adhered, otherwise joined, abutted, mated, or otherwise assembled even in the absence of an interlocking structure such as the tongues 545 and grooves 547.

Figure 6:
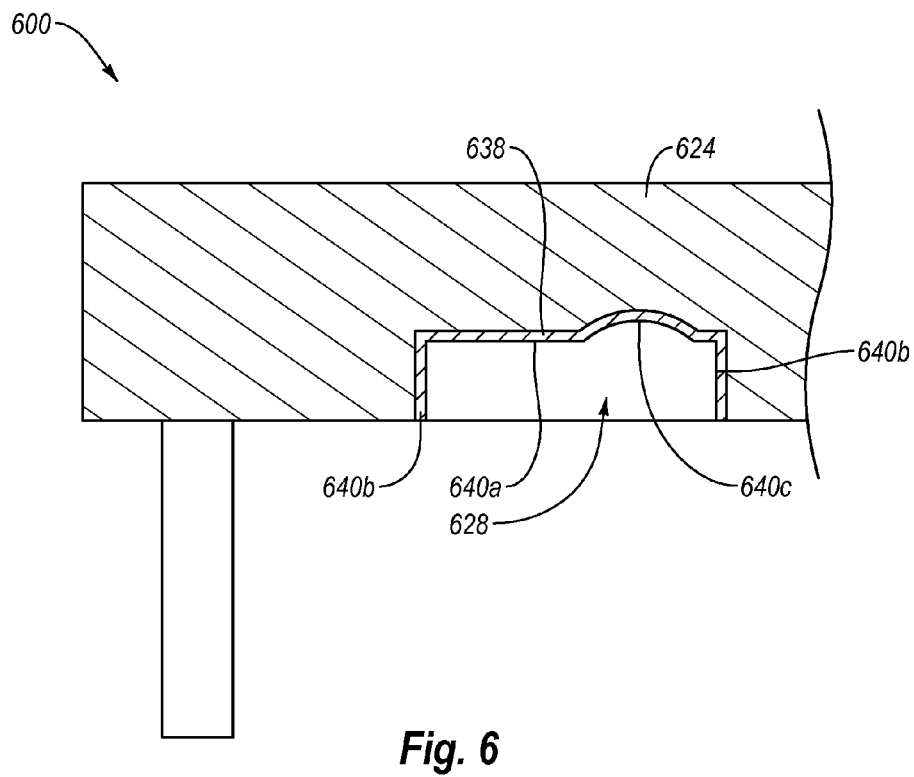
FIG. 6 is a partial side cross-sectional view of an injection mold assembly having a superhard material that is not supported by a substrate, in accordance with another embodiment.

Turning now to FIG. 6, injection mold assembly 600 is illustrated in accordance with another embodiment. The injection mold assembly 600 includes a mold plate 624 that acts as a base for a mold cavity 628 defined by a molding element 638. The molding element 638 includes multiple surfaces 640a-c that define the mold cavity 628. The molding element 638 may be formed from a unitary piece of material, such as a superhard material, or may be assembled together from different segments.

Figure 7:
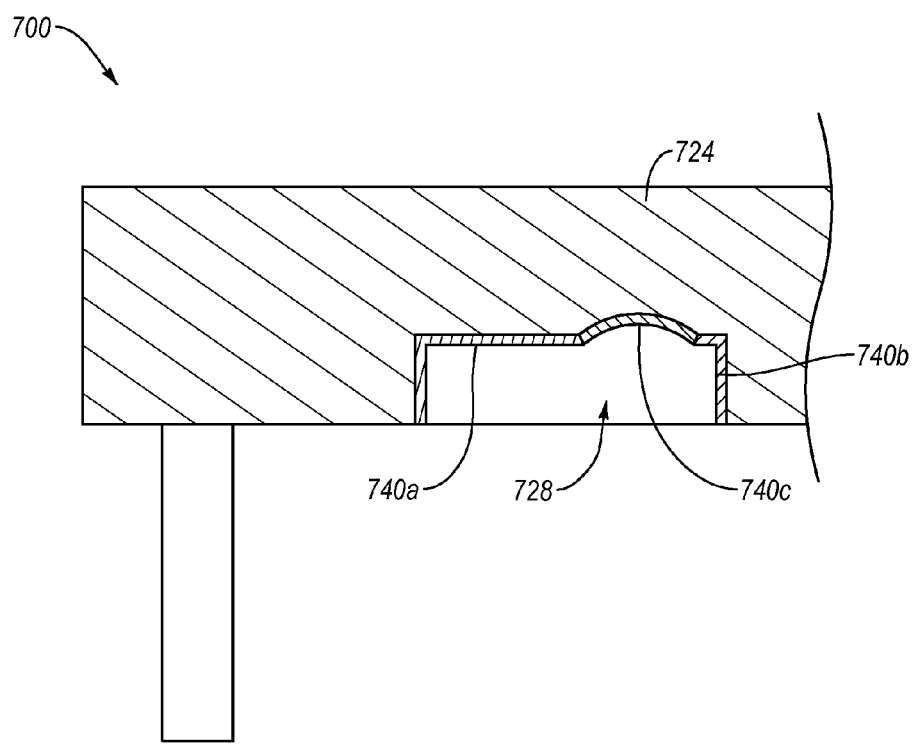
FIG. 7 is a partial side cross-sectional view of an injection mold assembly having a superhard material attached to at least one additional material in accordance with another embodiment.

A single type of material may be used to produce the multiple surfaces 640a-c of the molding element 638 although this is merely exemplary (see, e.g., FIG. 7). Any suitable material may be used, and in accordance with at least one embodiment, the material of the molding element 638 is a superhard material. By way of illustration, the molding element 638 may include polycrystalline diamond or a PDC including polycrystalline diamond. As discussed herein, PDCs may include a polycrystalline diamond table bonded to a substrate when formed. Thereafter, the substrate and the PDCs may be machined, molded, or otherwise formed into the desired shapes and inserted within, or otherwise attached to, the mold plate 624. In some embodiments, such as that illustrated in FIG. 6, the molding element 638 is optionally connected to the mold plate 624 without a substrate. For instance, after PDCs are formed, a grinding or other machining process may be used to remove the substrate. A resulting polycrystalline diamond structure may then be secured to the mold plate 624, or secured to a steel or aluminum component that is attached to the mold plate 624, or otherwise used to define all or a portion of the mold cavity 628.

In the illustrated embodiment, the molding element 648 includes a base surface 640a that connects to opposing side surfaces 640b. Also connected to the base surface 640a is a curved surface 640c. As discussed herein, the side surfaces 640b may also be curved. For instance, the side surfaces 640b may extend circumferentially around the mold cavity 628. The mold surfaces 640a-c are integrally formed from a unitary piece of material, although as discussed herein, the mold surfaces 640a-c may alternatively be formed as different segments and then attached to each other and/or the mold plate 624 to define the mold cavity 628.

In other embodiments, the surfaces around a mold cavity 628 may include two or more different materials. For instance, FIG. 7 illustrates a cross-sectional view of an injection mold assembly 700 that defines a mold cavity 728 that is substantially identical in shape to the mold cavity 628 of FIG. 6. In FIG. 7, however, multiple mold segments 740a-c may be connected together to provide the surfaces defining the mold cavity 728. The mold segments 740a-c may each be made of the same material or, as shown in FIG. 7, may be made from two or more different materials.

Over time, as an injection mold is used, even properly maintained injection molds wear down and ultimately reach the end of their lifecycle. To maximize the lifecycle of the mold, the surfaces defining the mold cavity should wear about evenly. In some cases, however, even wear is not possible or practical. Based on the mold design, the part being produced, and the like, certain sections of a mold may be prone to more rapid wear than other sections of a mold.

Accordingly, in some embodiments, a mold is adapted to use different materials at different mold sections to account for different wear rates. For instance, superhard materials may be placed in a mold at locations that have an elevated wear rate, and may not be used for the entire surface of the mold cavity. For instance, with continued reference to FIG. 7, molten polymer may be injected into the mold cavity 728. A location of elevated wear rate may be determined to exist. Such location may, for instance, be along the curved mold segment 740c. Accordingly, in one embodiment, the curved mold segment 740c may include a PDC or other superhard material. Possibly, other areas of the mold cavity 748 also exhibit other wear rates. For instance, the wear rate along the first mold segment 740a may be different than the wear rate along the second mold segment 740b, and the wear rates along the first and second mold segments 740a, 740b may each be different than the wear rate along the curved mold segment 740c.

To account for the differences in wear rate, different materials may be used to form each of the mold segments 740a-c. As noted above, PDC or a superhard material may, for instance, be used to form the curved mold segment 740c. A different superhard material, or some other material, may be used to form the first and second mold segments 740a, 740b. For instance, a substrate material may be used to form one or both of the first and second mold segments 740a, 740b. In another embodiment, steel, aluminum, beryllium-copper alloy, or some other material, or a combination thereof may form one or both of the first and second mold segments 740a, 740b. Accordingly, in some embodiments, wear rate differentials may be at least partially counteracted by using different materials at different sections of the mold cavity 728.

Use of a superhard material along the full surface defining the mold cavity 728 may provide maximum wear resistance in the injection mold assembly 700, particularly when compared to traditional mold materials. Nevertheless, some superhard materials are more expensive to produce and use than more traditional materials. Particularly in mold assemblies in which certain sections wear at a faster rate than other sections, the use of superhard materials may be particularly cost effective. In particular, rather than requiring the cost of a full cavity superhard material, the life of the a standard mold may be significantly increased by using superhard materials only sections that are likely to exhibit the greatest wear. Thus, lower cost materials may be used for much of the mold while superhard materials are used only where most needed.

Figure 8:
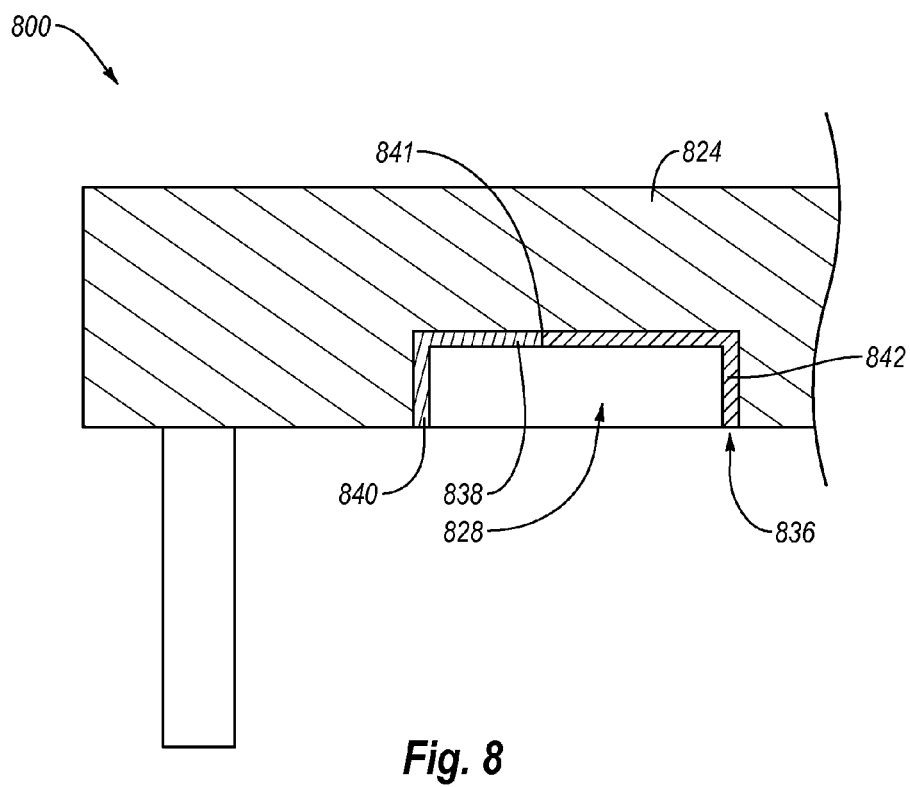
FIG. 8 is a partial side cross-sectional view of an injection mold assembly having a super hard material coupled to at least one additional material in accordance with still another embodiment.
Figure 9A:
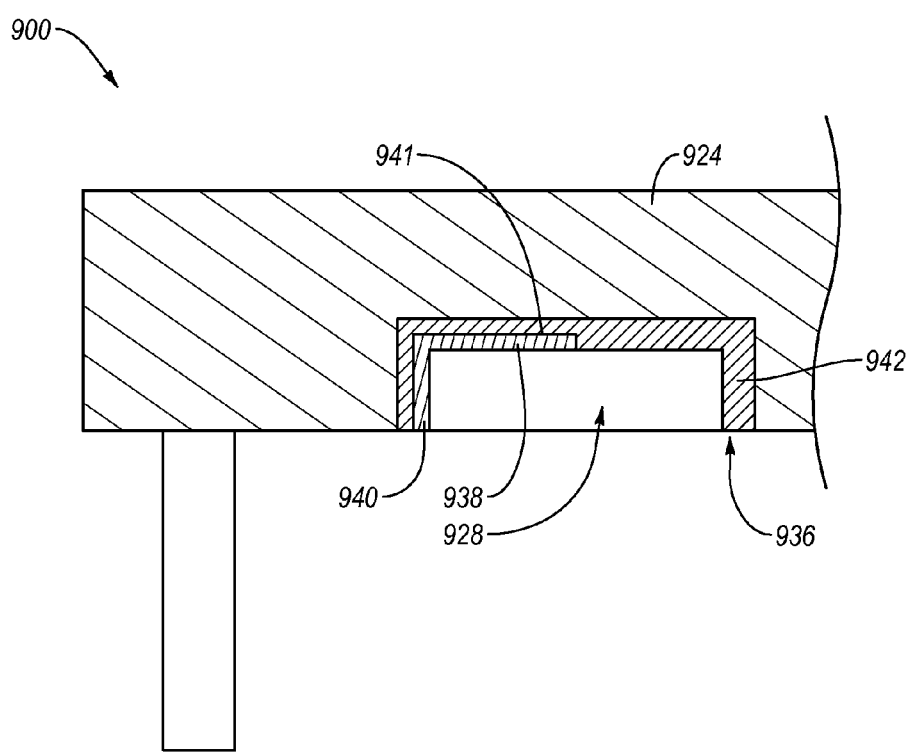
FIG. 9A is a partial side cross-sectional view of an injection mold assembly having a substrate fully encapsulating a superhard material in accordance with yet another embodiment.
Figure 9B:
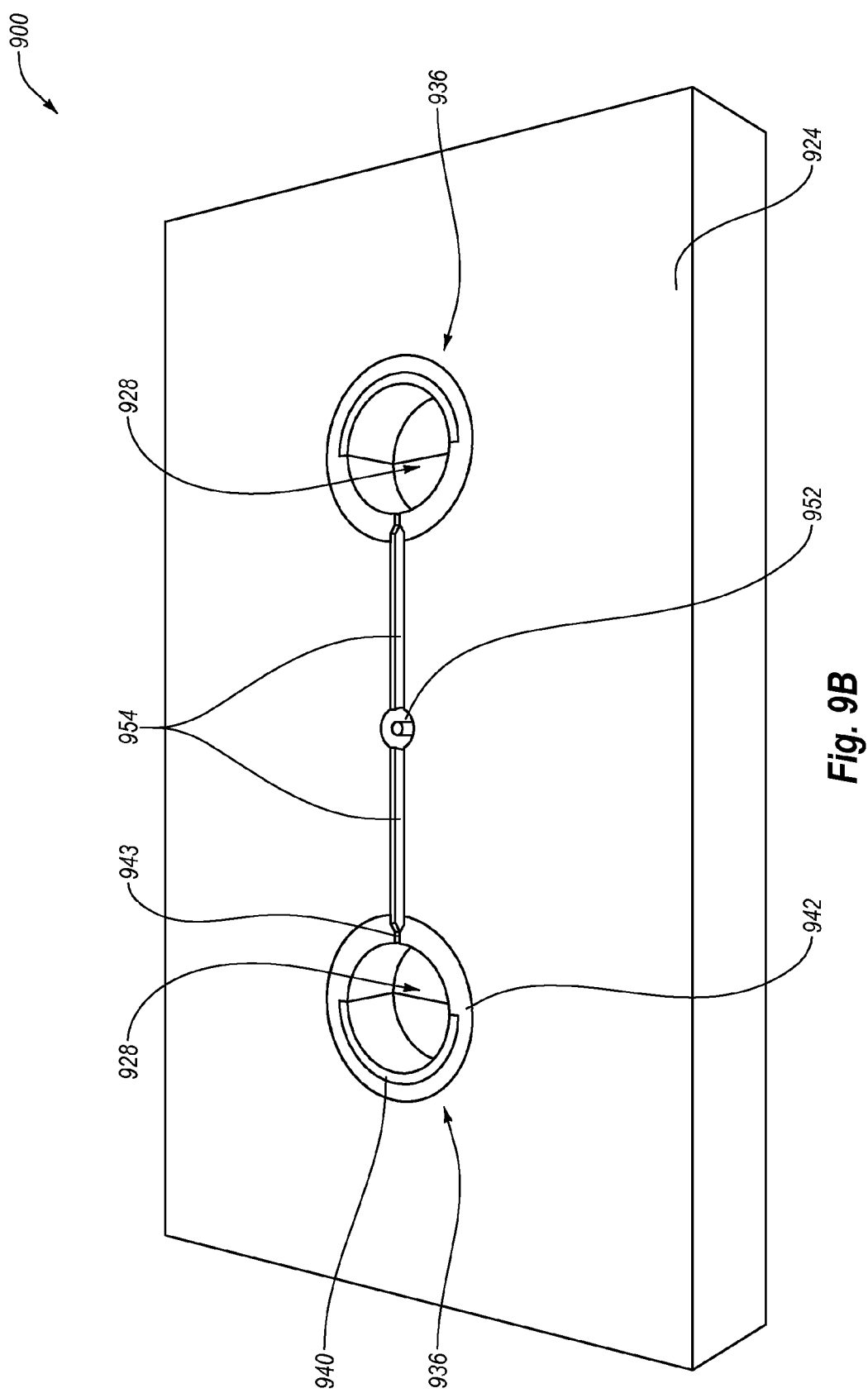
FIG. 9B is an isometric view of the injection mold assembly of FIG. 9A.

FIGS. 8-9B illustrate still additional embodiments of injection mold assemblies. FIG. 8 illustrates an injection mold assembly 800 that includes a mold plate 824 defining a mold cavity 828. Molten polymer injected into the mold cavity 828 is allowed to cool and produces a component of the desired shape.

The mold cavity 828 is defined by a set of surfaces. Such surfaces may be machined directly into the mold plate 824 or, as shown in FIG. 8, may be defined by a mold insert 836 that is inserted into a generic cavity within the mold plate 824. The mold insert 836 of FIG. 8 includes a molding element 838 that includes two different materials. More specifically, the molding element 838 includes a superhard segment 840 as well as a second segment 842. The second segment may be formed from any number of different materials, including a tungsten, steel, aluminum, beryllium-copper alloy, or some other material, or a combination of the foregoing.

In one embodiment, the molding element 838 includes a superhard segment 840 and the second segment 842 is formed from a substrate material 842. As discussed herein, superhard materials such as polycrystalline diamond may be formed using a process that produces a polycrystalline diamond structure that is bonded to a substrate, such that the substrate supports the polycrystalline diamond. In contrast, FIG. 8 illustrates a superhard segment 842 that is adjacent—rather than on top of—a substrate. The superhard segment 842 may, for instance, be a polycrystalline diamond formed into a PDC and thereafter machined to remove the supporting substrate. The same or different substrate may be used to produce the second segment 842, and which is placed adjacent the superhard segment 840 to define the mold cavity 828. At an interface between the superhard segment 840 and the second segment 842, a seam 841 is formed.

Typically, a seam in a mold transfers to molded components, such that the seam is also visible in the final product. Where such seams are undesirable, the seam 841 may be treated. For instance, a filler material (e.g., a brazing alloy) may be placed along the seam 841. The filler material may be ground or polished to reduce or eliminate the appearance of the seam in molded components. The filler material may wear down over time; however, the process of covering the seam may be performed numerous times during the lifecycle of the mold assembly 800.

Turning now to FIGS. 9A and 9B, still another example embodiment of an injection mold assembly 900 is illustrated. In this particular embodiment, a mold insert 936 is prepared for insertion into a generic cavity of a mold plate 924. More particularly still, the mold insert 936 includes multiple different materials that define a molding element 938 bounding a mold cavity 924 formed within the mold insert 936.

In this particular embodiment, the insert 936 includes two segments 940, 942. A first segment 940 may, for instance, be formed from a superhard material, while a second segment 942 is formed from a different superhard material, a substrate, some other material, or a combination thereof. Alternatively, the second segment 942 could be formed from a superhard material and the first segment 940 from some other material.

Where the first segment 940 includes a superhard material, the illustrated embodiment includes a second segment 942 that not only defines a portion of the mold cavity 928, but fully encapsulates the first segment 940. For instance, in the illustrated embodiment, the first segment 940 is secured within a groove 941 formed in the second segment 942. The second segment 942 may, for instance, be formed from a substrate material and be bonded to the superhard material of the first segment 940. Additionally, or alternatively, the second segment 942 may be formed of other materials (e.g., steel, aluminum) and be attached to the superhard material of the first segment 940. In some embodiments, the first and second segments 940, 942 are both superhard and/or substrate materials.

FIG. 9B illustrates an isometric view of a full mold plate 924 of the injection mold assembly 900 of FIG. 9A. As shown in FIG. 9B, the mold plate 924 defines two generic cavities, and a mold inserts 936 is inserted into each generic cavity. In this embodiment, the mold inserts 936 are identical and each define cylindrical mold cavities 928, although such features are merely exemplary. In other embodiments, there may be more or fewer than two mold inserts 936, the mold inserts 936 may be different relative to each other, or the mold inserts 936 may define mold cavities 928 having different shapes or configurations. More particularly, although the mold cavity 928 is illustrated in FIG. 9B as having a circular cross-sectional geometry, the mold cavity 928 may also be configured to form a molded part having any cross-sectional geometry, such as a rectangular or triangular cross-sectional geometry or other desired cross-sectional geometry. The mold cavity 928 may also be configured to form a part having a varying cross-sectional geometry.

As also shown in FIG. 9B, the mold cavities 928 are partially bounded by a first segment 940 and by a second segment 942. The first segment 940 is fully encapsulated by the second segment 942. As discussed herein, the first and/or second segment 940, 942 may include a superhard material, although one or both of the first or second segments 940, 942 may also include any number of other materials, including steel, aluminum, tungsten, or other materials, or a combination of the foregoing.

While FIGS. 9A and 9B have been described with respect to a mold insert 936 that includes first and second mold segments 940, 942 that may be collectively inserted into the mold plate 924 and which fully define a mold cavity 928, a mold insert 936 and/or a mold cavity 928 may be formed or configured in other manners. For instance, in accordance with at least one embodiment, the second segment 942 may be located within the mold plate 924 at a different time than the first segment 940. For instance, the second segment 942 may be formed of a material that is first inserted into the mold plate 924, and secured to the mold plate 924. Thereafter, the first segment 940 may be inserted into the groove 941 (FIG. 9A) defined in the second segment 942 and secured to the second segment 942 in a suitable manner. Alternatively, the second segment 942 may be integrally formed within the mold plate 924. In such case, the mold insert 936 may include only the first mold segment 940. Thus, the mold cavity 928 may be partially defined by the mold insert 936 and partially defined by the mold plate 924.

The mold plate 924 illustrated in FIG. 9B is illustrative of an exemplary mold plate 924 that may be used in connection with a moveable or stationary platen of an injection molding press. In the particular embodiment, the mold plate 924 includes generic cavities to receive the mold inserts 936 of FIG. 9A. A mold plate configured in a similar manner may also be produced to receive or include the various components illustrated in FIGS. 3-8.

The mold plate 924 of FIG. 9B also includes a sprue 952 through which molten polymer may be provided to the mold plate 924. Extending from the sprue 952 is a set of runners 954. The runners 954 are designed to carry the molten polymer from the sprue 952 and into the mold cavity 928. To ensure that the molten polymer enters the mold cavity 952, a gate 943 may be formed in a side wall of the mold insert 936. The gate 943 may be shaped as a channel or nozzle to allow the molten polymer to enter and fill the cavity 928. As illustrated in FIG. 9B, the gate 943 may be formed in the second segment 942 of the mold insert 936. In other embodiments, however, the gate 943 may additionally or alternatively be formed in the first segment 940, or in other suitable locations within the mold insert 936 and/or mold plate 924.

Figure 10:
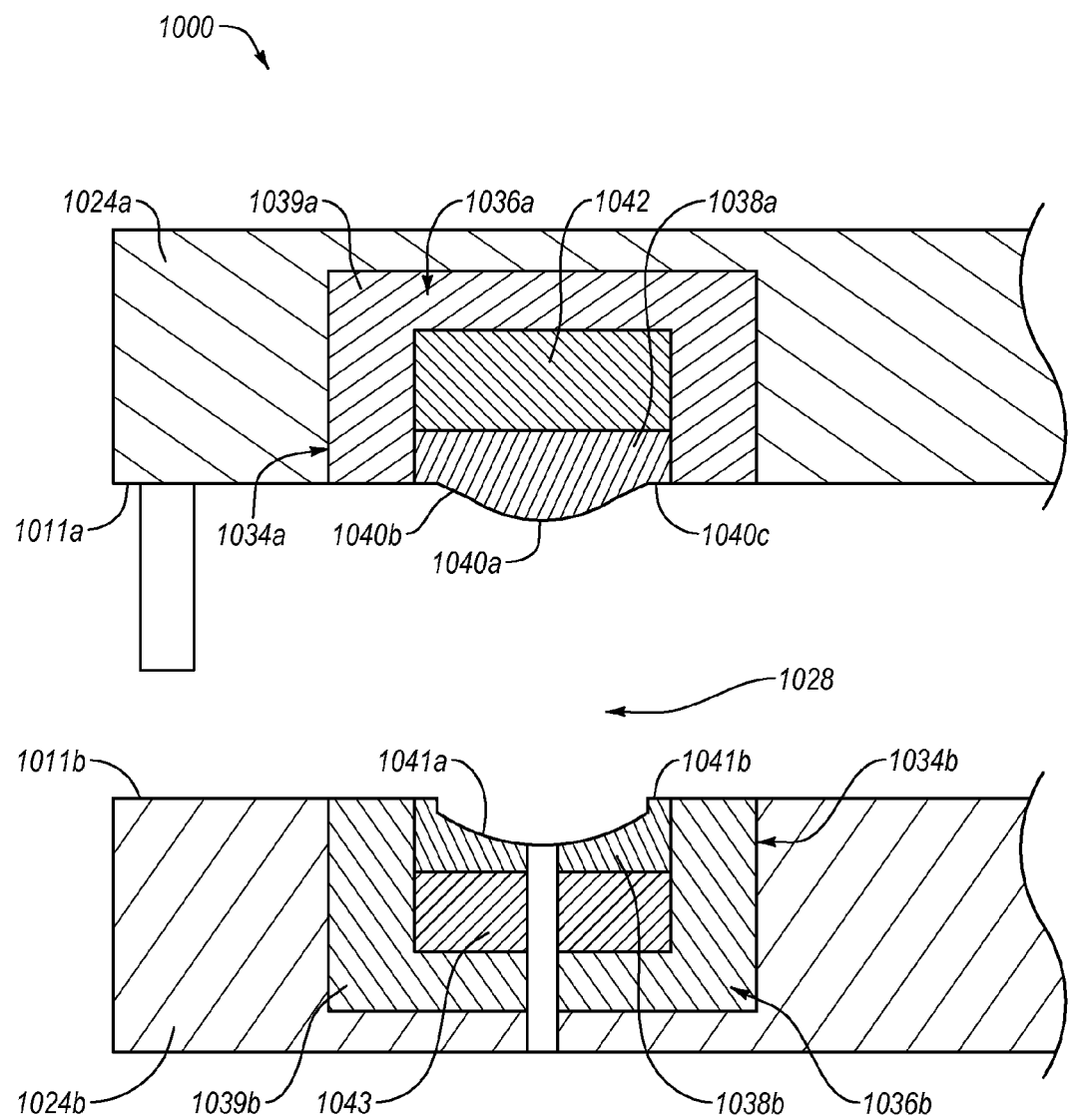
FIG. 10 is a cross-sectional view of an injection mold assembly having a superhard material defining at least a portion of a curved surface in accordance with another embodiment.

Turning now to FIG. 10, still another example embodiment of an injection mold assembly 1000 is illustrated. As noted previously, embodiments of the present disclosure may include mold cavities having any number of different shapes, contours, recesses, protrusions, other topographical features, or combinations of the foregoing. FIG. 10 illustrates an embodiment in which two mold plates 1024a, 1024 are configured to cooperate to collectively define a lens-shaped mold cavity 1028. The mold cavity 1028 is illustrated as being in an open configuration. In practice, the mold cavity 1028 remains open until the cooperating mold plates 1024a, 1024b are placed immediately adjacent each other (e.g., by abutting at mating surfaces 1011a, 1011b), thereby closing the mold cavity 1028.

More particularly, FIG. 10 illustrates a cross-sectional view of an injection mold assembly 1000 that includes a mold cavity 1028 that is defined at least partially by first and second molding elements 1038a and 1038b. In the illustrated embodiment, the first molding element 1038a has a convex surface 1040a generally corresponding to a concave surface 1041a formed in the second molding element 1038b. When the mold cavity 1028 is in a closed configuration, the cavity 1028 may have, for example, a lens shape. Consequently, if a material is injected or otherwise placed within the mold cavity 1028, the injection mold assembly 1000 may be used to produce a lens of a desired size, shape, focal length, magnification, and the like.

To produce a lens or other part or component of a desired shape, the molding elements 1038a, 1038b may have multiple, cooperating topographical features. For instance, in defining the lens-shaped mold cavity 1028, the first molding element 1038a may include a curved surface 1040a connected to a transitional surface 1040b and/or an edge surface 1040c. More particularly, in the illustrated embodiment, the curved surface 1040a is substantially centered within the molding element 1038a. Extending around the curved surface 1040a is a transitional surface 1040b that serves to at least partially define the mold cavity 1028 and/or to connect the curved surface 1040a to the edge surface 1040c. In this embodiment, the edge surface 1040c is a substantially planar surface, and the transitional surface 1040b is an inclined surface. In other embodiments, however, edge surfaces and/or transitional surfaces may be excluded or may have other contours, shapes, features, other topographical features, or any combination of the foregoing.

For instance, the second molding element 1038b defines at least a portion of the mold cavity 1028 and includes a different set of contours, shapes, and/or topographical features than the first molding element 1038a. For instance, the curved surface 1041a of the second molding element 1038b may have a larger or smaller radius of curvature as compared to the curved surface 1040a. As will be appreciated in view of the disclosure herein, differing curvature radii can be used to vary a thickness of the mold cavity 1028 at different radial or other positions, although in other embodiments, the thickness of the mold cavity 1028 remains substantially constant. Additionally, in the illustrated embodiment, the curved surface 1041 a may connect or intersect directly with an edge surface 1041b, rather than by using one or more transitional or intermediate surfaces. While the edge surface 1041b in FIG. 10 is illustrated as having an annular, generally planar configuration, any other suitable configuration may be used.

As described herein, the injection mold assembly 1000 may include any number of different materials so as to define the mold cavity 1028. For instance, as described above, particularly with reference to FIG. 7, multiple different types of materials may be used, even within a single mold plate, to form the at least some of the surfaces of a mold cavity. In other embodiments, a single material may be used within a mold plate to define a surface of a mold cavity. By way of example, in FIG. 10, the mold plates 1024a, 1024b include molds 1036a, 1036b in which the molding elements 1038a, 1038b each have a substantially uniform material at the surfaces defining the mold cavity 1028. For instance, the mold 1036*a* within the first mold plate 1024*a* may include the curved, transitional, and edge surfaces 1040*a*, 1040*b*, 1040*c*, with each of the surfaces 1040*a-c* being formed of a single material. Similarly, the mold 1036*b* within the second mold plate 1024*b* may include curved and edge surfaces 1041*a* and 1041*b* formed of a single material, and such material may be the same or different than a material used to form the surfaces 1040*a-c*. By way of illustration, the surfaces 1040*a-c* and/or 1041*a* and 1041*b* may be formed of one or more segments of a PDC or other superhard material.

In the illustrated embodiment, the interior surfaces of the molding elements 1038*a*, 1038*b* define at least a portion of the mold cavity 1028, while external surfaces of the molding elements 1038*a*, 1038*b* are bonded to substrates 1042, 1043. For simplicity, the substrates 1042, 1043 are illustrated as single elements fully supporting the molding elements 1038*a*, 1038*b*, although in view of the disclosure herein, one skilled in the art will appreciate that the substrates 1042, 1043 may be formed of any number of different segments, may have any number of different shapes, or may be otherwise configured. In one embodiment, the substrate 1042 and/or the substrate 1043 is a carbide substrate including tungsten carbide, tantalum carbide, vanadium carbide, niobium carbide, chromium carbide, titanium carbide, or some other carbide, or any combination of the foregoing.

In accordance with at least some embodiments, the molds 1036*a*, 1036*b* may be machined or otherwise formed directly in or on the mold plates 1024*a*, 1024*b*. In other embodiments, the molds 1036*a*, 1036*b* may be formed as mold inserts that can be inserted into a generic or other cavity within the mold plates 1024*a*, 1024*b*. For instance, the first mold 1036*a* may include a molding element 1038*a* and substrate 1042 that are inserted into or otherwise connected to a recess or other feature of the first mold plate 1024*a*. Similarly, the second mold 1036*b* may include a molding element 1038*b* and substrate 1043 that are inserted into or otherwise connected to a recess or other feature of the second mold plate 1024*b*. In FIG. 10, the mold plates 1024*a*, 1024*b* may each include generic cavities 1034*a*, 1034*b*. The generic cavities 1034*a*, 1034*b* have, in this embodiment, a size that is significantly larger than that the size of the molding elements 1038*a*, 1038*b* connected to respective substrates 1042, 1043.

To facilitate insertion and securement of the molds 1036*a*, 1036*b* within the generic cavities 1034*a*, 1034*b*, the molds 1036*a*, 1036*b* include base insert segments 1039*a*, 1039*b*. In particular, the first mold 1036*a* includes a base insert segment 1039*a*, and the second mold 1036*b* includes a base insert segment 1039*b*. The first base insert segment 1039*a* defines, in the illustrated embodiment, a recess which fully encompasses the substrate 1042, such that the first base insert 1039*a* abuts and is optionally secured to both the substrate 1042 and the molding element 1038*a*, and although this is merely exemplary. In other embodiments, the base insert segment 1039*a* may be excluded, may connect to only one of the substrate 1042 or the molding element 1038*a*. The base insert segment 1039*b* of the second mold 1036*b* may be similarly configured. For instance, in FIG. 10, the second base insert segment 1039*b* defines a recess into which both the substrate 1043 and the second molding element 1038*b* are at least partially received. In some embodiments, the base insert segments 1039*a*, 1039*b* may be used solely for securing and/or placing the molds 1036*a*, 1036*b* within the generic cavities 1034*a*, 1034*b*. In other embodiments, however, the base insert segments 1039*a*, 1039*b* may have additional aspects. For instance, in the illustrated embodiment, the base insert segments 1039*a*, 1039*b* may form at least a portion of the surface(s) of the mold cavity 1028.

The base insert segments 1039*a*, 1039*b* may be formed from any number of different materials. For instance, in some embodiments, the base insert segments 1039*a*, 1039*b* are formed of steel, aluminum, beryllium-copper alloy, ceramics, composites, or other metals or materials. The base insert segments 1039*a*, 1039*b* may also be formed from superhard materials, including PCDs and/or carbide substrate materials. The base insert segments 1039*a*, 1039*b* may also be formed of any combination of the foregoing.

As noted above, the mold cavity 1028 of FIG. 10 may be a lens-shaped mold cavity. Any suitable type of lens may be formed, for any number of purposes or applications. For instance, different types of lenses that may be formed using the principles described herein include collecting, diverging, symmetric, asymmetric, bioconvex, bioconcave, plano-convex, plano-concave, positive meniscus, negative meniscus, or other lens. Furthermore, material injected into the mold cavity 1028 may cool to form a flexible or rigid lens. Accordingly, lenses producible according to embodiments of the present disclosure may be used in any number of different applications (e.g., contact lenses, photographic lenses, etc.). Nevertheless, a lens is only one type of object that can be produced using the principles disclosed herein.

In some embodiments disclosed herein including a mold having threads (e.g., internal or external) may comprise a surface at least partially formed of a superhard material (e.g., HPHT sintered PCD). For instance, with reference to FIG. 11, still another embodiment of an injection mold assembly 1100 is illustrated. In particular, the injection mold assembly 1100 is shown as a partial cross-sectional view, and illustrates a mold cavity 1128 suitable for forming an exemplary female threaded connector.

Figure 11:
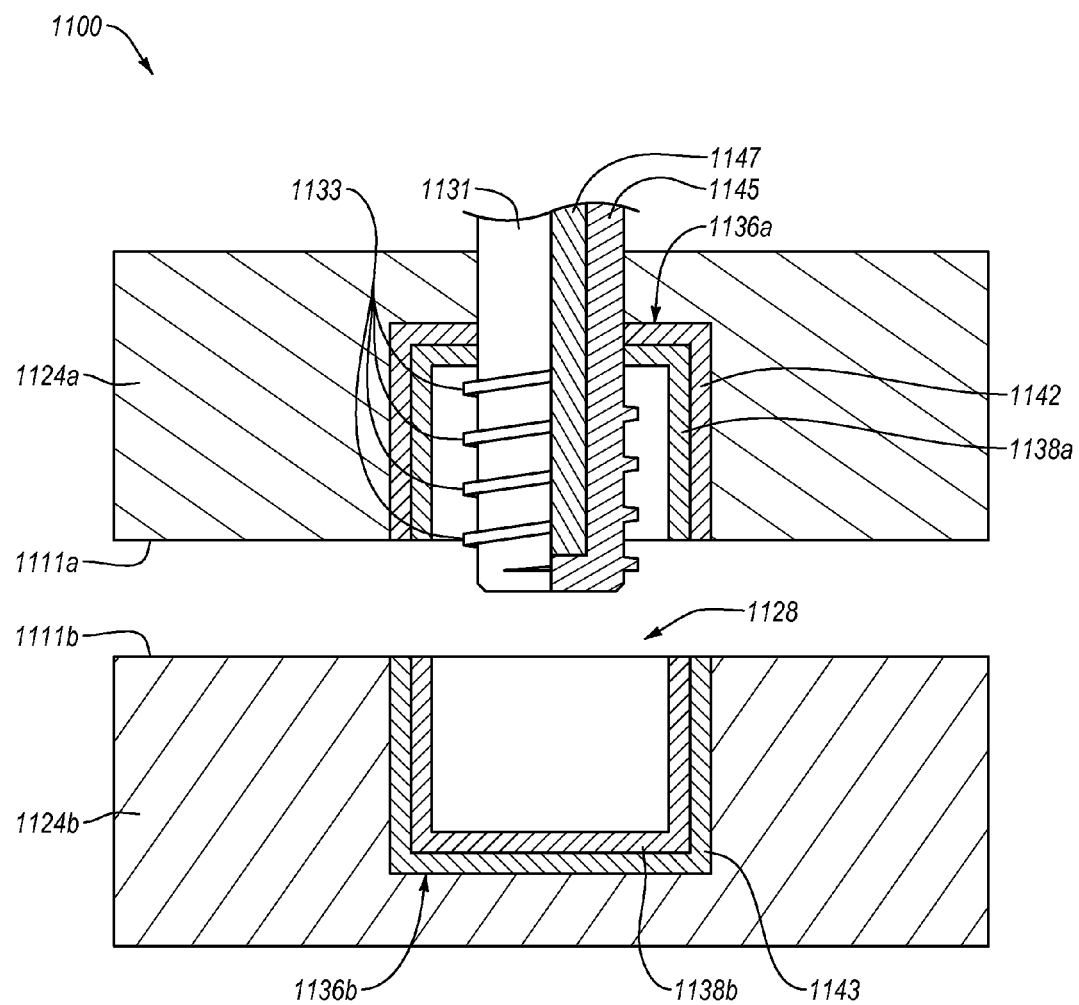
FIG. 11 is a partial cross-sectional view of an injection mold assembly having superhard material defining at least a portion of a mold cavity for a female threaded component in accordance with another embodiment.

More particularly, the injection mold assembly 1100 may include first and second mold plates 1124*a*, 1124*b*. The mold plates 1124*a*, 1124*b* are shown in FIG. 11 has defining a mold cavity 1128 with an open configuration. As the mold plates 1124*a*, 1124*b* are, however, drawn together, such that they abut generally along respective mating surfaces 1111*a* and 1111*b*, the mold cavity 1128 may transition to a closed configuration.

The mold cavity 1128 may have a compound shape defined by one or more surfaces. For instance, the first and second mold plates 1124*a*, 1124*b* may include respective mold elements 1138*a*, 1138*b* that define at least a portion of a surface of the mold cavity 1128. For instance, the mold cavity 1128, as defined by the mold elements 1138*a*, 1138*b*, has a generally rectangular cross-sectional shape. Consequently, a part or component produced using the injection mold assembly 1100 may have a generally cylindrical, rectangular prismatic, or other suitable shape. The mold cavity 1128 is, however, presented merely for illustrative purposes, and may be have any number of different shapes, configurations, topographical features, or any combination of the foregoing.

In at least some embodiments, a compound shape of the mold cavity 1128 may be defined by an insert 1131. In the illustrated embodiment, for instance, the insert 1131 may be a thread insert. More particularly, multiple threads 1133 may be defined on the exterior surface of the insert 1131. Consequently, when the insert 1131 is positioned within the mold cavity 1128, a part or component produced using the injection mold assembly 1100 may be formed to include internal threads.

In some embodiments, the insert 1131 may be selectively retractable. For instance, when the mold cavity 1128 is placed in a closed configuration, the insert 1131 may be selectively extended through all or a portion of the first mold plate 1124 and into the mold cavity 1128. An injection molding process may then occur, and the plastic or other molding material(s) may be allowed to cool. When the mold plates 1128 are then retracted such that the mold cavity 1128 is opened, the molded component may remain engaged to the insert 1131. Consequently, to remove the molded component, the insert 1131 may be retracted at least partially through the first mold plate 1124a. Where the insert 1131 defines threads or other helical features, the insert 1131 may be retracted by, for instance, selectively rotating the insert 1131 such that as it rotates, it retracts from the mold cavity 1128. Selective retraction of the insert 1131 may occur before, after, or during the retraction of the mold plates 1124a, 1124b relative to each other.

The surfaces of the mold cavity 1128 may be formed from one or more different materials. For instance, in the illustrated embodiment, the mold plates 1124a, 1124b are illustrated as defining generic cavities into which respective mold inserts 1136a, 1136b may be placed, although this is merely exemplary. The mold inserts 1136a, 1136b may, in turn, have multiple materials. For instance, first materials 1138a, 1138b (e.g., superhard materials) may form one or more outer surfaces defining at least a portion of the mold cavity 1128, while second material 1142, 1143 (e.g., substrate materials, steel, aluminum, etc.) may be adjacent at least some portions of the first materials 1138a, 1138b, and form one or more inner surfaces that can be used to couple the molds 1136a, 1136b to the mold plates 1124a, 1124b. As will be appreciated in view of the disclosure herein, the molds 1136a, 1136b can include a number of different materials, segments, surfaces, shapes, contours, topographical features, or other configurations, or any combination of the foregoing.

The insert 1131 may also be formed of superhard or other materials. In FIG. 11, for instance, a partial cross-sectional view of the insert 1131 illustrates an exterior surface 1145 formed of a first material, while a core 1147 is formed from a second material. In some embodiments, at least a portion of the exterior surface 1145 may be formed of superhard materials while the core 1147 is formed of substrate materials or other materials. The insert 1131 in FIG. 11 is, however, merely exemplary. In some embodiments, the insert 1131 may be formed of a single material or from more than two materials. For instance, the threads 1133 may be particularly susceptible to wear, so the threads 1133 may be formed from a different material than all or a portion of the rest of the exterior surface 1145. It is also not necessary that the insert 1131 include superhard materials. For instance, the insert 1131 may be formed of steel, aluminum, beryllium-copper alloy, or other materials, or any combination of the foregoing.

Figure 12:
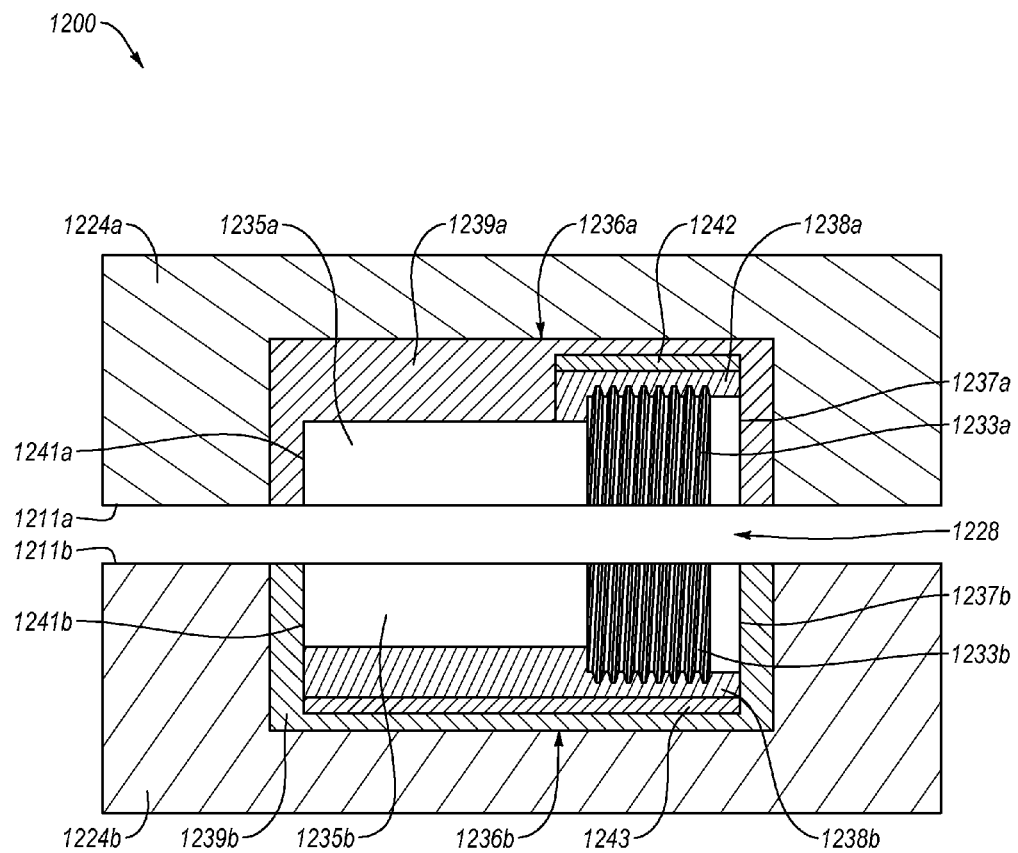
FIG. 12 is a cross-sectional view of an injection mold assembly having superhard material defining at least a portion of a mold cavity for a male threaded component in accordance with another embodiment.

FIG. 12 illustrates still another example embodiment of an injection mold assembly 1200 that may be used to form a threaded part or component. For instance, the mold assembly 1200 may be used to form external threads on a component.

More particularly, in the illustrated embodiment, the injection mold assembly 1200 includes two mold plates 1224a, 1224b. The mold plates 1224a, 1224b are illustrated as defining a mold cavity 1228, which is shown in an open configuration. By moving one or both of mold plates 1224a, 1224b relative to each other, such that mold plates 1224a, 1224b abut generally at mating surfaces 1211a, 1211b, the mold cavity 1228 can be placed in a closed configuration.

In the illustrated embodiment, the mold cavity 1228 is collectively defined by molds 1236a, 1236b that reside in each of the mold plates 1224a, 1224b. Further, the molds 1236a, 1236b are configured to cooperate to form a single part that has annular, external threads therearound. More particularly, the first mold 1236a defines a first portion 1233a of the annular threads, while the second mold 1236b defines a second portion 1233b of the annular threads. The first and second portions 1233a, 1233b of the annular threads are aligned such that a part formed within the mold cavity 1228 can have a set of continuous threads therearound. Once the part has cooled, the first and second mold plates 1224a, 1224b may be separated to extract the formed part.

In some embodiments, plastic or another material is injected into the mold cavity 1228 to form the part with the threads therearound. The injected material may be injected at one or more locations into the mold cavity 1228, and material may contact different portions of the surfaces around the mold cavity 1228b at different pressures, different temperatures, and the like. In some cases, multiple different materials may also be injected at different locations. As a result of varying conditions throughout the mold cavity 1228, different locations of the molds 1236a, 1236b may wear at different rates. For instance, in one embodiment, the threads 1233a, 1233b may be particularly susceptible to wear. Accordingly, in some embodiments, different portions of the mold cavity 1228 are lined with, or defined at least partially by, differing materials. In particular, in FIG. 12, at least two different materials may define portions of at least some surfaces of the mold cavity 1228, although more or fewer than two materials may be used.

In the illustrated embodiment, the first mold 1236a is positioned within the first mold plate 1224a, and includes three different materials. In particular, in this embodiment, a first material 1238a is positioned within the mold 1236a and used to define at least a portion of the threads 1233a. More particularly, the first material 1238a may be machined, ground, polished, molded, or otherwise formed to define a set of annular threads 1233a around at least a portion of the mold cavity 1228. In some embodiments, the threads 1233a are all formed by surfaces formed within the first material 1238a, although in other embodiments, the threads 1233a may be defined by surfaces within multiple materials. In the first mold 1236a, the first material 1238a may be any suitable material (e.g., a superhard material, substrate, steel, aluminum, etc.). In some embodiments, for instance, the first material 1238a is a PCD, and the first material 1238a is bonded to a substrate material 1242. The substrate material 1243 optionally defines a surface of the mold cavity, although the substrate material 1243 does not do so in the first mold 1236b.

The first material 1238a in FIG. 12 substantially defines the threads 1233a, and is adjacent a third material 1239a that defines a recess 1235a and end surfaces 1237a, 1241a of the mold cavity 1228. In particular, the third material 1239a defines a surface extending around at least a portion of a semi-cylindrical recess 1235a. The semi-cylindrical recess 1235a may be bounded by semi-circular end surfaces 1237a, 1241a. For instance, a first end surface 1237a may be formed proximate the threads 1233a, while a second end surface 1241a may be distal relative to the threads 1233a.

The second mold 1236b may also be similarly configured, although such need not be the case. For instance, in FIG. 12, the second mold 1236b is configured differently relative to the first mold 1236a. In particular, the second mold 1236b may include three materials 1238b, 1243, and 1239b, each of which define at least a portion of the surface(s) of the mold cavity 1228.

For instance, the second mold 1236b may also include a set of threads 1233b. The threads 1233b may generally correspond to the threads 1233a in the first mold 1236b, and optionally define a set of continuous threads therewith. The threads 1233b in the second mold 1236b are defined by a set of surfaces in a first material 1238b. In this embodiment, the first material 1238b may also be used to define at least a portion of the recess 1235b. For instance, the first material 1238b may define a surface extending substantially an entire length of the mold cavity 1228 and/or the recess 1235b. The first material 1238b may also be used to define first and second semi-circular end surfaces 1237b, 1241b, although in FIG. 12, this is not the case. More particularly, in the illustrated embodiment, the end surfaces 1237b, 1241b are defined by a third material 1239b which is formed around the first material 1238b and a second material 1243 on which the first material 1238b is disposed.

In each of the first and second molds 1236a, 1236b any number of different materials and types of materials may be used. According to at least one embodiment, a superhard material may be used to define at least a portion of a surface of the mold cavity 1228. For instance, first materials 1238a, 1238b may be superhard materials, although this is merely exemplary. In other embodiments, one or both of first materials 1238a, 1238b includes a material other than a superhard material. The second and third materials 1242, 1243, 1239a, 1239b may also be formed from suitable materials. For instance, material 1242 and/or 1243 may include steel, aluminum, or other materials, or may be a carbide substrate, or some other type of substrate material. Material 1239a and/or material 1239b may also be superhard materials, substrate materials, steel, aluminum, beryllium-copper alloy, other metals or composites, or other types of materials, or a combination of the foregoing. Regardless of the type of materials used, the mold cavity 1228 may be formed such that a part having threads includes one or more types of materials at different portions of the surfaces defining the mold cavity 1228.

Figure 13:
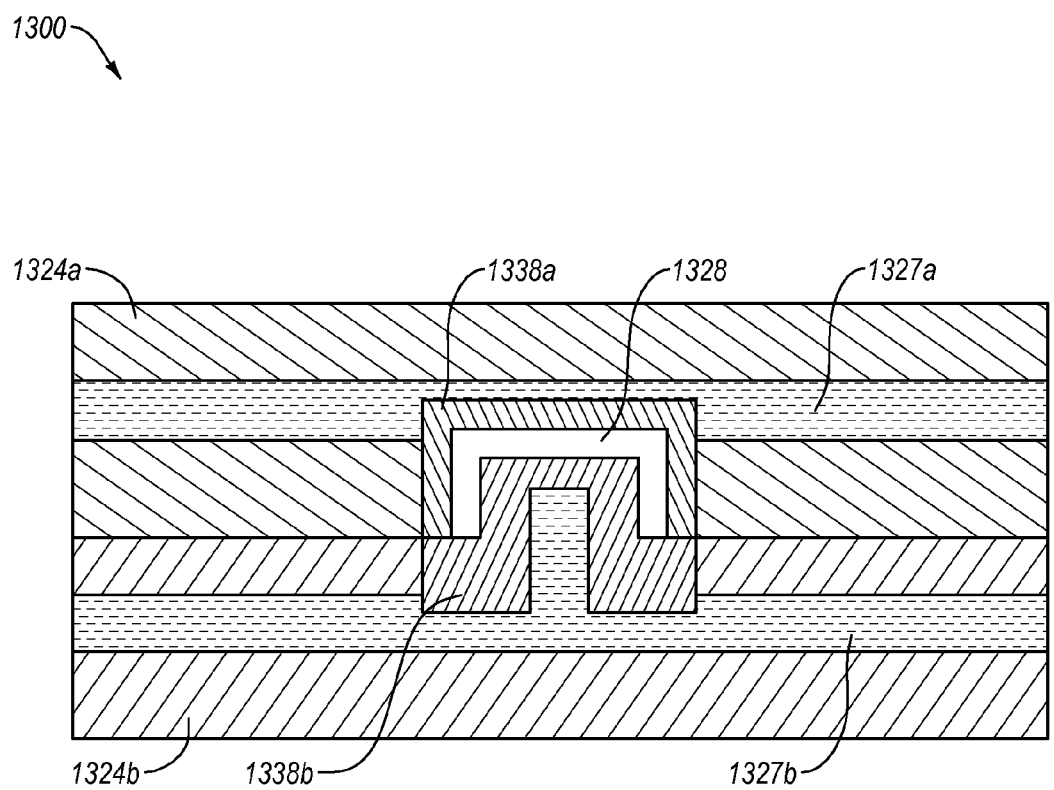
FIG. 13 is a partial cross-sectional view of an injection mold assembly having superhard material defining at least a portion of a mold cavity and having a water coolant line in contact with the superhard material in accordance with another embodiment.

FIG. 13 illustrates a cross-sectional view of an injection mold assembly 1300 according to still another embodiment. In the illustrated embodiment, a set of two mold plates 1324a, 1324b define a mold cavity 1328. The mold cavity 1328 is illustrated in a closed configuration; however, by separating the mold plates 1324a, 1324b, the mold cavity 1328 may transition to an open configuration. The open configuration may be used to, for instance, extract a part molded within the mold cavity 1328.

The illustrated injection mold assembly 1000 illustrates an example cooling system for a mold cavity 1328. In particular, in the illustrated embodiment, the mold cavity 1328 is defined at least partially by a first surface 1338a in the first mold plate 1324a, and by a second surface 1338b in the second mold plate 1324b. Material placed within the mold cavity 1328 may be injected at a high temperature. Before the part or component formed within the mold cavity 1328 can be removed, the material may need to be cooled. To speed cooling of the injected material, the first and second mold plates 1324a, 1324b each include coolant lines 1327a, 1327b. The coolant lines 1327a, 1327b may, for instance, extend through a portion of the first and second mold plates 1324a, 1324b, and be configured to absorb heat transmitted from the injected material and through the mold surfaces 1338a, 1338b. Water or another fluid may, for instance, flow through the coolant lines 1327a, 1327b. Such a fluid can be pumped through the coolant lines 1327a, 1327b (e.g., from a source external to mold plates 1324a, 1324b), and can transfer the heat of the injected material away from the mold plates 1324a and 1324b. As the rate of heat transfer may be increased by using the fluid, the injected material and the part formed thereof can be cooled at an accelerated rate.

In addition to the coolant lines 1327a, 1327b, the type of material used in forming the mold surfaces 1338a, 1338b may further facilitate controlling the temperature within the mold cavity 1328. According to one embodiment, the mold surfaces 1338a, 1338b may be made from one or more materials having thermal conductivity properties that help to control the temperature of the mold cavity 1328. For instance, the mold surface 1338a and/or the mold surface 1338b may be formed from PCD. Not only may the thermal conductivity properties of PCD facilitate heat transfer from the mold cavity 1328 to the coolant lines 1327a, 1327b, but the PCD may also allow direct contact between the coolant lines 1327a, 1327b and the mold surfaces 1338a, 1338b. Whereas steel or other materials may exhibit corrosion over prolonged exposure to water or another coolant, PCD materials may be non-corrosive. Consequently, the PCD may be placed in direct contact with the fluid in the coolant lines 1327a, 1327b. In allowing direct contact between the fluid and the mold surfaces 1338a, 1338b, heat conductivity can be increased.

Figure 14:
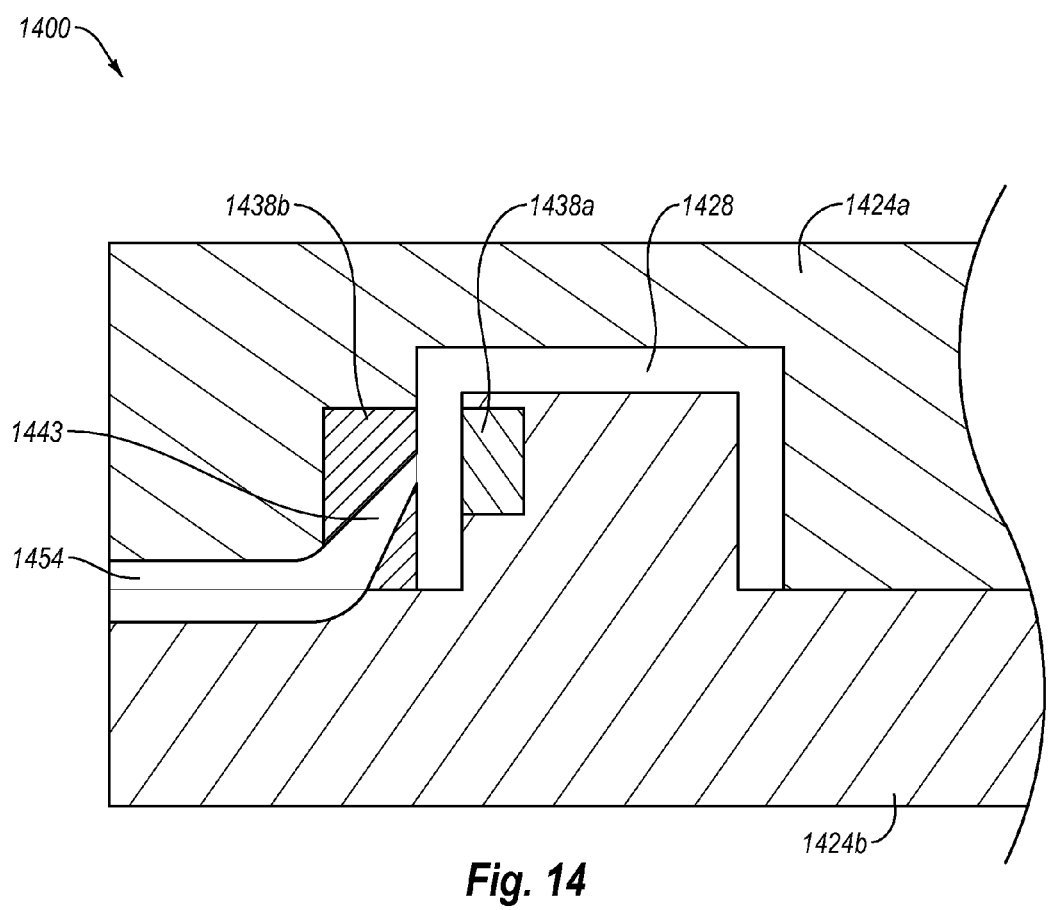
FIG. 14 is a side cross-sectional view of an injection mold assembly having superhard material defining at least a portion of a mold cavity proximate a submarine gate in accordance with another embodiment.

With reference now to FIG. 14, still another embodiment of an injection molding assembly 1400 is illustrated. As will be appreciated in view of the disclosure herein, superhard and other types of materials may be used to prolong the useful life of an injection mold. For instance, as discussed previously, superhard or other materials may be used to define particular surfaces, or portions thereof, of a mold cavity, particularly where such portions are adjacent high wear regions of the mold cavity. It will also be appreciated that high wear regions within a mold may also occur at other areas of a mold, and not necessarily within a mold cavity defining a shape of a formed part or component. For instance, a mold may include runners, sprues, gates and other similar components to facilitate flow of injectable materials to a mold cavity. Such components may also be susceptible to wear and may benefit from the use of superhard or other materials. Thus, the instant disclosure contemplates that at least a portion of a runner, sprue, gate, and/or similar components to facilitate flow of injectable materials into a mold cavity may comprise a superhard material (e.g., HPHT sintered PCD).

For instance, in FIG. 14, the injection molding assembly 1400 is illustrated as including two mold plates 1424a, 1424b that cooperate to define a mold cavity 1428. In this embodiment, material may be injected into the mold cavity 1428. More particularly, injectable material may be carried through a runner 1454 and through a gate 1443. The gate 1443 may interface with the mold cavity 1428 by, for instance, being in fluid communication therewith. Material flowing through the gate 1443 may thus be passed into the mold cavity 1428 to form a part or component having a shape as defined by the mold cavity 1428.

The runner 1454 and/or the gate 1443 may also be in high wear regions. In particular, as fluid flows through the runner 1454 and/or the gate 1443, the material may tend to wear the surfaces around the runner 1454 and/or the gate 1443 more quickly than other areas of the mold plates 1424a, 1424b. As a result, the useful life of the injection mold system 1400 may be reduced.

To increase the life of the injection mold assembly 1400, high wear regions within the injection mold assembly 1400 may be lined with any of the superhard materials disclosed herein or other materials that resist the increased rate of wear. By way of illustration, an area of the mold cavity 1428 that is adjacent the interface between the gate 1443 and the mold cavity 1428 may be a high wear region. For instance, the gate 1443 may act as a nozzle that causes injected materials to flow at a high pressure into the mold cavity 1428 and potentially against a wall within the mold cavity 1428. In FIG. 14, a first superhard material 1438a has been positioned at a location where increased wear is likely due to the high pressure injection of injectable materials into the mold cavity 1428.

The area around the gate 1443 may also be highly susceptible to wear. The gate 1443 may, for instance, reduce its cross-sectional size, which may cause materials to flow at a greater speed along at least a portion of the length of the gate 1443. The wear rate may increase along with the increase in flow rate. To counteract such an increase in the wear rate, a second superhard material 1438b may be placed adjacent the gate 1443. In particular, in the illustrated embodiment, the gate 1443 is defined at least partially by a recess or other feature formed within the second superhard material 1438b. As a result, injected materials may flow through the second superhard material 1438b and into the mold cavity 1428. Due to the wear resistive properties of superhard materials, the surfaces defining the gate 1443 may wear at a rate that is slower than a comparable gate defined within steel, aluminum, or another material that wears at a greater rate.

In FIG. 14, the runner 1454 is illustrated as being collectively defined by the first and second mold plates 1424a, 1424b, while the gate 1443 is illustrated as being formed primarily in the first mold plate 1424a. As a result, the second superhard material 1438b surrounding the gate 1443 may be located entirely within the first mold plate 1424a. In the illustrated embodiment, the first superhard material 1438a is located entirely within the second mold plate 1424b. The type and location of the gate may, however, vary the location of high wear regions, and the likely placement of superhard or other materials to reduce the wear rate in such regions. For instance, while the gate 1443 in FIG. 14B is a submarine or tunnel gate, the use of superhard materials along all or a portion of a surface of a gate extends to other types of gate designs. For instance, the submarine or tunnel gate 1443 may be replaced with a shear gate, side gate, fan gate, film gate, pin gate, banana gate, direct gate, or diaphragm gate. Regardless of the type of gate used, the above described principles may be incorporated to, for instance, reduce the wear around all or a portion of the gate, or around all or a portion of a runner or sprue used to convey material through a gate and to a mold cavity.

While various aspects and embodiments have been disclosed herein, other aspects and embodiments are contemplated. The various aspects and embodiments disclosed herein are for purposes of illustration and are not intended to be limiting. It is intended that components and features of the illustrated and described embodiments be interchangeable with other embodiments described and illustrated herein, or which may be learned by a review of the disclosure herein. The words "including," "having," and variants thereof (e.g., "includes" and "has") as used herein, including the claims, are open ended and shall have the same meaning as the word "comprising" and variants thereof (e.g., "comprise" and "comprises").

The invention claimed is:

1. An injection mold assembly, comprising:
a first mold plate;
a second mold plate; and
a molding element secured to one of the first or second mold plates, the first and second mold plates configured to be abutted along respective mating surfaces thereof to form a mold cavity, the molding element comprising a polycrystalline diamond material, wherein the polycrystalline diamond material includes one or more segments defining at least a portion of the mold cavity, wherein the one or more segments include at least two non-unitary segments including at least one seam therebetween.

2. The injection mold assembly of claim 1 wherein the one or more segments is defined at least partially by two segments that each include the polycrystalline diamond material.

3. The injection mold assembly of claim 1 wherein the one or more segments defining the at least a portion of the mold cavity including at least two different superhard materials.

4. The injection mold assembly of claim 1 wherein the one or more segments further includes a non-superhard portion.

5. The injection mold assembly of claim 1, wherein at least one of the first or second mold plates defines a generic cavity, the injection mold assembly further comprising:
a mold insert, wherein the mold insert is sized to be received at least partially the generic cavity when secured to the first or second mold plate, the mold insert including the molding element.

6. The injection mold assembly of claim 1 wherein the mold cavity defines at least two areas having different wear sensitivity, the polycrystalline diamond material being located at an area of relatively higher wear sensitivity.

7. An injection mold insert, comprising:
a molding element including a surface defining at least a portion of a mold cavity, wherein the surface comprises a polycrystalline diamond material, wherein the polycrystalline diamond material includes one or more segments defining at least a portion of the surface, wherein the one or more segments include at least two non-unitary segments including at least one seam therebetween; and
wherein the molding element is sized and configured to be inserted at least partially into a generic cavity of an injection mold plate, and secured to the injection mold plate.

8. The injection mold insert of claim 7 wherein the substrate defines at least a portion of the mold cavity.

9. The injection mold insert of claim 7 wherein the polycrystalline diamond material defines the entire surface.

10. The injection mold insert of claim 7 wherein the surface comprises at least two mold segments, the at least two mold segments being joined together and positioned:
in a substantially parallel orientation;
in an angularly offset orientation; or
circumferentially adjacent to one another about at least a portion of the mold cavity.

11. The injection mold insert of claim 7 wherein the polycrystalline diamond material comprises a material having a limited maximum production size in a high-pressure/high-temperature press, and wherein the mold cavity has a size exceeding the limited maximum production size.

12. The injection mold insert of claim 7 wherein a cemented tungsten carbide substrate is bonded to the polycrystalline diamond material.

13. An injection mold press, comprising:
an injection mold assembly including:
a first mold plate;
a second mold plate; and
a molding element secured to one of the first or second mold plates, the first and second mold plates configured to be abutted along respective mating surfaces thereof to form a mold cavity, the molding element comprising a polycrystalline diamond material forming at least a portion of the mold cavity, with the polycrystalline diamond material bonded to a substrate, wherein the polycrystalline diamond material includes one or more segments defining at least a portion of the mold cavity, wherein the one or more segments include at least two non-unitary segments including at least one seam therebetween; and an injection system operably coupled to the injection mold assembly, the injection system configured to convey the material into the mold cavity of the injection mold assembly.

* * * * *